(12) United States Patent
Ge et al.

(10) Patent No.: US 11,818,714 B2
(45) Date of Patent: Nov. 14, 2023

(54) TRANSMISSION CONTROL METHOD, TERMINAL DEVICE, AND NETWORK DEVICE

(71) Applicant: HUAWEI TECHNOLOGIES CO., LTD., Shenzhen (CN)

(72) Inventors: Shibin Ge, Shanghai (CN); Xiaohan Wang, Shanghai (CN); Yong Liu, Shenzhen (CN); Huangping Jin, Shanghai (CN); Xiaoyan Bi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 70 days.

(21) Appl. No.: 16/986,167

(22) Filed: Aug. 5, 2020

(65) Prior Publication Data

US 2020/0367272 A1 Nov. 19, 2020

Related U.S. Application Data

(63) Continuation of application No. PCT/CN2019/071120, filed on Jan. 10, 2019.

(30) Foreign Application Priority Data

Feb. 9, 2018 (CN) .......................... 201810134557.2

(51) Int. Cl.
*H04W 72/12* (2009.01)
*H04L 1/18* (2006.01)
(Continued)

(52) U.S. Cl.
CPC ....... *H04W 72/1278* (2013.01); *H04L 1/1812* (2013.01); *H04W 72/23* (2023.01)

(58) Field of Classification Search
CPC ....... H04B 7/04; H04L 1/0023; H04L 1/1607; H04L 1/1812; H04L 1/1854;
(Continued)

(56) References Cited

U.S. PATENT DOCUMENTS 8,848,600 B2 * 9/2014 Ko ........................ H04B 7/0639
370/319
9,532,352 B2 * 12/2016 Webb .................. H04W 72/042
(Continued)

FOREIGN PATENT DOCUMENTS

| CN | 101882980 A | 11/2010 |
| CN | 102036305 A | 4/2011 |

(Continued)

OTHER PUBLICATIONS

Huawei et al,"TB mapping for Slot aggregation", 3GPP TSG RAN WG1 Meeting #89, R1-1706901, Hangzhou, China, May 15-19, 2017, total 8 pages.
(Continued)

*Primary Examiner* — Eric Nowlin
(74) *Attorney, Agent, or Firm* — Stein IP, LLC

(57) ABSTRACT

A transmission control method includes: receiving N pieces of transmission control information; and generating, based on the N pieces of transmission control information, transmission feedback information corresponding to transport blocks respectively scheduled by using the N pieces of transmission control information. Transport blocks can be accurately distinguished based on different effective transmission parameter group fields, and an effective feedback is provided.

40 Claims, 6 Drawing Sheets

(51) Int. Cl.
*H04W 72/04* (2009.01)
*H04L 1/1812* (2023.01)
*H04W 72/23* (2023.01)

(58) Field of Classification Search
CPC ... H04L 1/1864; H04L 5/0053; H04L 5/0055; H04W 72/042; H04W 72/1278
See application file for complete search history.

(56) References Cited

U.S. PATENT DOCUMENTS

| | | | | |
|---|---|---|---|---|
| 10,158,461 | B2* | 12/2018 | Li | H04L 5/0091 |
| 10,313,084 | B2* | 6/2019 | Papasakellariou | H04W 72/0413 |
| 10,356,809 | B2* | 7/2019 | Xia | H04W 72/0446 |
| 10,531,452 | B2* | 1/2020 | Sun | H04L 1/189 |
| 11,159,278 | B2* | 10/2021 | Xue | H04L 1/1614 |
| 11,290,911 | B2* | 3/2022 | Kim | H04L 1/00 |
| 2013/0016604 | A1* | 1/2013 | Ko | H04L 1/1861 370/216 |
| 2014/0161108 | A1* | 6/2014 | Lohr | H04L 5/0007 370/336 |
| 2016/0157213 | A1* | 6/2016 | Takeda | H04W 72/0446 370/329 |
| 2016/0338041 | A1* | 11/2016 | Li | H04L 5/0091 |
| 2018/0014298 | A1* | 1/2018 | Sun | H04W 72/0446 |
| 2018/0199314 | A1* | 7/2018 | Takeda | H04W 72/1268 |
| 2018/0279289 | A1* | 9/2018 | Islam | H04W 72/0446 |
| 2019/0109693 | A1* | 4/2019 | Papasakellariou | H04L 1/1607 |
| 2019/0181986 | A1* | 6/2019 | Kitamura | H04L 1/1819 |
| 2020/0220666 | A1* | 7/2020 | Xue | H04L 1/1854 |
| 2020/0314886 | A1* | 10/2020 | Cohen | H04L 1/1642 |
| 2021/0075561 | A1* | 3/2021 | Baldemair | H04L 1/1822 |
| 2021/0250807 | A1* | 8/2021 | Lin | H04L 1/1854 |
| 2021/0298057 | A1* | 9/2021 | Hu | H04L 5/0092 |
| 2022/0070897 | A1* | 3/2022 | Hwang | H04L 1/1854 |
| 2022/0116171 | A1* | 4/2022 | Zhang | H04L 1/08 |

FOREIGN PATENT DOCUMENTS

| | | | | | |
|---|---|---|---|---|---|
| CN | 102598570 | A | | 7/2012 | |
| CN | 102611538 | A | | 7/2012 | |
| CN | 102067648 | B | | 6/2013 | |
| CN | 104065453 | A | | 9/2014 | |
| CN | 106992837 | A | | 7/2017 | |
| CN | 107078881 | A | | 8/2017 | |
| CN | 107359970 | A | | 11/2017 | |
| CN | 107370591 | A | | 11/2017 | |
| CN | 109417449 | A | * | 3/2019 | ........... H04L 1/1614 |
| CN | 112438068 | A | * | 3/2021 | ........... H04L 1/1642 |
| CN | 109417449 | B | * | 11/2021 | ........... H04L 1/1614 |
| EP | 2244514 | A1 | | 10/2010 | |
| EP | 2406911 | A4 | * | 4/2017 | ........... H04L 1/1607 |
| EP | 3482516 | B1 | * | 3/2020 | ........... H04L 1/1614 |
| EP | 3716515 | A1 | * | 9/2020 | ........... H04L 1/1642 |
| EP | 3259867 | B1 | * | 1/2022 | ........... H04L 1/0027 |
| WO | WO-2016182406 | A1 | * | 11/2016 | ........... H04L 1/0027 |
| WO | 2017172488 | A1 | | 10/2017 | |
| WO | WO-2018013449 | A1 | * | 1/2018 | ........... H04L 1/1614 |
| WO | WO-2020192720 | A1 | * | 10/2020 | ........... H04L 1/1642 |

OTHER PUBLICATIONS

ETRI,"PDCCH design for multi-beam operation", SGPP TSG RAN WG1 Meeting #91, R1-1720231, Reno, USA, Nov. 27-Dec. 1, 2017, total 6 pages.
3GPP TS 38.331 V15.0.0 (Dec. 2017);3rd Generation Partnership Project;Technical Specification Group Radio Access Network;NR-;Radio Resource Control (RRC) protocol specification(Release 15);total 188 pages.
ASUSTeK,"NDI handling for transmission mode change",3GPP TSG-WG2 Meeting #72bis, R2-110368, Dublin, Ireland, Jan. 17-21, 2011, total 4 pages.
3GPP TS 38.213 V15.0.0 (Dec. 2017),3rd Generation Partnership Project Technical Specification Group Radio Access Network;NR;Physical layer procedures for control(Release 15), total 56 pages.
3GPP TS 38.214 V15.0.0 (Dec. 2017),3rd Generation Partnership Project;Technical Specification Group Radio Access Network;NR;Physical layer procedures for data (Release 15), total 71 pages.

* cited by examiner

TRANSMISSION CONTROL METHOD, TERMINAL DEVICE, AND NETWORK DEVICE

CROSS-REFERENCE TO RELATED APPLICATIONS

This application is a continuation of International Application No. PCT/CN2019/071120, filed on Jan. 10, 2019, which claims priority to Chinese Patent Application No. 201810134557.2, filed on Feb. 9, 2018. The disclosures of the aforementioned applications are hereby incorporated by reference in their entireties.

TECHNICAL FIELD

Aspects of this application relate to the field of communications technologies, and specifically, to a transport block processing method, a network device, and a terminal.

BACKGROUND

A transport block (TB) may usually be, for example, but is not limited to, a data block including a medium access control (MAC) protocol data unit (PDU). The data block is transmitted in a time period. The time period may be, for example, a transmission time interval (TTI). Each terminal can send a maximum of two transport blocks in one time period, and a network device can also send a maximum of two transport blocks to the same terminal in each time period.

Generally. TBs are all scheduled by using downlink control information (DCI). Two TBs to be sent to the same terminal in a time period may be scheduled by using one piece of DCI, or may be scheduled by using different DCI. Regardless of whether one piece of DCI is used to schedule two TBs or two pieces of DCI are used to schedule the two TBs, two TBs scheduled in the same time period are usually identified by a same hybrid automatic repeat request (HARQ) identity (ID). If two TBs scheduled by using the same piece of DCI are identified by the same HARQ ID, a terminal can distinguish between the two TBs by using different fields occupied by the two TBs. If two or more TBs scheduled by using different DCI are identified by the same HARQ ID, the terminal may be unable to distinguish between the two or more transport blocks, and consequently cannot provide a feedback specific to the two or more transport blocks.

SUMMARY

To provide an effective feedback specific to transport blocks scheduled by using at least two pieces of transmission control information, embodiments of this application provide a transport block control method, to accurately distinguish between the transport blocks respectively scheduled by using the at least two pieces of transmission control information, and provide an effective feedback. The embodiments of this application further provide a corresponding terminal device and network device.

A first aspect of the embodiments of this application provides a transmission control method, including: receiving N pieces of transmission control information, where each piece of transmission control information is used to schedule one transport block and includes F transmission parameter group fields: a first transmission parameter group field to an $F^{th}$ transmission parameter group field, only one of the F transmission parameter group fields in each piece of transmission control information is effective, and an effective transmission parameter group field in each of the N pieces of transmission control information is different from effective transmission parameter group fields in other pieces of transmission control information, where N is an integer greater than 1, and F is an integer greater than or equal to N; and generating, based on the N pieces of transmission control information, transmission feedback information corresponding to transport blocks respectively scheduled by using the N pieces of transmission control information, where the transmission feedback information includes N feedback fields: a first feedback field to an $N^{th}$ feedback field, and an $M^{th}$ feedback field is used to provide a feedback specific to a transport block scheduled by using transmission control information that is in the N pieces of transmission control information and in which an effective transmission parameter group field is a $Q^{th}$ transmission parameter group field, where M is an integer, $1 \leq M \leq N$, Q is an integer, and $1 \leq Q \leq F$. It should be noted that the $M^{th}$ feedback field in the N feedback fields in the transmission feedback information is not used to indicate an arrangement sequence number of the feedback field in the N feedback fields. For example, if N=8, M=3, and Q=2, a third feedback field may be used to provide a feedback specific to a transport block scheduled by using transmission control information that is in eight pieces of transmission control information and in which an effective transmission parameter group field is a second transmission parameter group field, and the third feedback field may be the seventh feedback field in eight feedback fields arranged sequentially. In addition, in this embodiment of the first aspect, the transmission control information may be DCI, the transmission parameter group field may be a transport block configuration information field in the DCI, and the configuration information field may include the following parameters: a modulation and coding scheme (MCS), a new data indicator (NDI), and a redundancy version (RV). It can be learned from the first aspect that, transport blocks respectively scheduled by using at least two pieces of transmission control information can be accurately distinguished, and even if HARQs corresponding to the two transport blocks are the same, the transport blocks can still be accurately distinguished based on different effective transmission parameter group fields; and an effective feedback is provided.

With reference to the first aspect, in a first possible implementation, the N pieces of transmission control information come from P network devices, where $1 \leq P \leq N$. It can be learned from the first possible implementation of the first aspect that, regardless of whether the N pieces of transmission control information come from a single network device or different network devices, transport blocks transmitted by the network device in a same time period can be accurately distinguished. If P is greater than 1, the P network devices interact with each other, so that an effective transmission parameter group field in each of the N pieces of transmission control information is determined; or one of the P network devices is preconfigured as a control end, and the control end allocates an effective transmission parameter group field to another network device. In this embodiment of this application, a same time period may be a same transmission time interval (TTI), a same slot, or another time length unit.

With reference to the first aspect or the first possible implementation of the first aspect, in a second possible implementation, at least one of the N pieces of transmission control information includes a transmission resource indication, and the transmission resource indication is used to indicate at least a transmission resource of the transmission feedback information. The transmission feedback information includes an ACK response corresponding to a correctly demodulated transport block and a NACK response corresponding to an incorrectly demodulated transport block. The transmission resource indication may indicate an uplink resource used during transmission of the transmission feedback information.

With reference to the second possible implementation of the first aspect, in a third possible implementation, the method further includes: determining, according to a selection policy, a target transmission resource indication used for the transmission feedback information, where when only one of the N pieces of transmission control information includes a transmission resource indication, the selection policy is an indication policy of selecting the transmission resource indication as the target transmission resource indication; when at least two of the N pieces of transmission control information include transmission resource indications, and the at least two transmission resource indications are the same, the selection policy is an indication policy of selecting the same transmission resource indication as the target transmission resource indication; or when at least two of the N pieces of transmission control information include transmission resource indications, the selection policy is an indication policy of selecting a specified transmission resource indication as the target transmission resource indication. It can be learned from the third possible implementation of the first aspect that, if only one of N pieces of DCI carries a transmission resource indication, a transmission resource indicated by the transmission resource indication is used to provide a feedback. If the N pieces of DCI carry a same transmission resource indication, the transmission resource indication of any piece of DCI is randomly selected, and a feedback is provided based on a transmission resource indicated by the transmission resource indication. If more than one of the N pieces of DCI carries a transmission resource indication, and all transmission resource indications are not the same, the target transmission resource indication may be selected according to a rule pre-established by the network device. For example, a transmission resource indication carried in DCI that is in the N pieces of DCI and that has a smallest control resource set (CORESET) identifier (ID) is specified as a target transmission resource to be used, or a transmission resource indication carried in DCI that is in DCI carrying transmission resource indications and that has a smallest CORESET ID is specified as a target transmission resource to be used. A CORESET is a time-frequency resource carrying DCI. Each CORESET has an ID, and a plurality of CORESETs may be configured on a network side. Therefore, there are a plurality of CORESET IDs. There is no same CORESET ID in a same time period. Certainly, a description is provided herein by using a smallest CORESET ID as an example. Actually, a largest CORESET ID may be used, or a specified option determined in another manner may be used. In addition, a CORESET ID is not the only identification manner, namely, using a CORESET ID. For example, a target transmission resource may alternatively be selected by using a quasi co-location (QCL) value range or a demodulation reference signal (DMRS) group identifier.

With reference to the second or the third possible implementation of the first aspect, in a fourth possible implementation, the method further includes: transmitting the transmission feedback information on a transmission resource indicated by the target transmission resource indication, where an arrangement sequence of the N feedback fields in the transmission feedback information is a sequence of transmission attributes of the N pieces of transmission control information. The transmission attribute may include a control resource set CORESET, quasi co-location (QCL), a format, or a demodulation reference signal (DMRS) group. Each type of transmission attribute has an attribute value sequence number, a sequence number, a value range, or a sequence identifier. For example, a CORESET ID sequence may be numbered from 1 and the number is successively incremented by 1: a CORESET 1, a CORESET 2, a CORESET 3, and so on. In this way, if there are two pieces of DCI: DCI 1 and DCI 2, a CORESET ID of the DCI 1 is a CORESET 1, the DCI 1 is used to schedule a TB 1, a CORESET ID of the DCI 2 is a CORESET 2, and the DCI 2 is used to schedule a TB 2, a transmission attribute sequence in this example is the CORESET 1→the CORESET 2. In other words, the CORESET 1 is arranged before the CORESET 2. Two feedback fields in the transmission feedback information are a first feedback field and a second feedback field, the first feedback field is sequentially arranged before the second feedback field, and a sequence of the first feedback field and the second feedback field is corresponding to a sequence of the CORESET 1 and the CORESET 2. Therefore, the first feedback field indicates a feedback specific to the TB 1, and the second feedback field indicates a feedback specific to the TB 2. For example, when a DMRS group sequence is used, the arrangement sequence of the N feedback fields in the transmission feedback information is a sequence of DMRS groups to which demodulation reference signal (DMRS) ports included in the N pieces of transmission control information belong. Each piece of DCI includes a DMRS port, and the DMRS port has been grouped into a DMRS group in advance. Therefore, one TB is corresponding to one DMRS group, each DMRS group has a number or an identifier, and all the DMRS groups have different numbers, for example, a DMRS group 1 and a DMRS group 2. Therefore, ACKs/NACKs that are in the transmission feedback fields and that are corresponding to scheduled transport blocks may be arranged based on a number sequence of the DMRS groups. Principles of other transmission attributes are basically the same as those of the CORESET ID and the DMRS group, and details are not described herein again. A feedback sequence of the feedback fields is determined based on a sequence corresponding to each of the DMRS group, the CORESET ID, the QCL, the format, or other attributes, to implement orderly feedback specific to a plurality of transport blocks without adding other fields or information for indication.

Certainly, optionally, the arrangement sequence of the N feedback fields in the transmission feedback information may be an arrangement sequence of effective transmission parameter group fields in the N pieces of transmission control information. Each piece of transmission control information includes F transmission parameter group fields: the first transmission parameter group field to the $F^{th}$ transmission parameter group field. The transmission parameter group fields can be understood as being arranged sequentially. For example, the first transmission parameter group field occupies the $9^{th}$ to $12^{th}$ bits in the transmission control information, the second transmission parameter group field occupies the $13^{th}$ to $15^{th}$ bits in the transmission control information, and other transmission parameter group fields may be sequentially arranged after the bits. The arrangement sequence of the effective transmission parameter group fields is an arrangement sequence of locations of all the effective transmission parameter group fields in transmission control information in which the effective transmission parameter group fields are located. For example, there are two pieces of transmission control information: DCI 1 and DCI 2. The DCI 1 is used to schedule a TB 2, and the DCI 2 is used to schedule a TB 1. The DCI 1 includes a first transmission parameter group field and a second transmission parameter group field that are arranged sequentially, and an effective transmission parameter group field in the DCI 1 is the first transmission parameter group field. The DCI 2 includes a first transmission parameter group field and a second transmission parameter group field that are arranged sequentially, and an effective transmission parameter group field in the DCI 2 is the second transmission parameter group field. Two feedback fields in the transmission feedback information are a first feedback field and a second feedback field, the first feedback field is sequentially arranged before the second feedback field, the first feedback field is corresponding to a transport block scheduled by using DCI whose effective transmission parameter group field is the first transmission parameter group field; and the second feedback field is corresponding to a transport block scheduled by using DCI whose effective transmission parameter group field is the second transmission parameter group field. Therefore, the first feedback field indicates a feedback specific to the TB 2 scheduled by using the DCI 1, and the second feedback field indicates a feedback specific to the TB 1 scheduled by using the DCI 2.

A second aspect of the embodiments of this application provides a transmission control method, including: receiving N pieces of transmission control information, where each piece of transmission control information is used to schedule one transport block, a transmission attribute of each of the N pieces of transmission control information is one of a first transmission attribute to an $N^{th}$ transmission attribute in a same type of transmission attributes, and a transmission attribute of any piece of transmission control information is different from transmission attributes of other pieces of transmission control information, where N is an integer greater than 1; and generating, based on the N pieces of transmission control information, transmission feedback information corresponding to transport blocks respectively scheduled by using the N pieces of transmission control information, where the transmission feedback information includes N feedback fields: a first feedback field to an $N^{th}$ feedback field, and an $M^{th}$ feedback field is used to provide a feedback specific to a transport block scheduled by using transmission control information that is in the N pieces of transmission control information and whose transmission attribute is $Q^{th}$ transmission attribute, where M is an integer, $1 \leq M \leq N$, Q is an integer, and $1 \leq Q \leq N$. It should be noted that the $M^{th}$ feedback field in the N feedback fields in the transmission feedback information is not used to indicate an arrangement sequence number of the feedback field in the N feedback fields. For example, if N=8, M=3, and Q=2, a third feedback field may be used to provide a feedback specific to a transport block scheduled by using transmission control information that is in eight pieces of transmission control information and whose transmission attribute is a second transmission attribute, and the third feedback field may be the seventh feedback field in eight feedback fields arranged sequentially. In addition, in this embodiment of the second aspect, the transmission control information may be DCI, and that transmission attributes are different may mean that numbers are different, identifiers are different, or value ranges are different. For example, the transmission attribute may include a control resource set CORESET, quasi co-location (QCL), a format, or a demodulation reference signal (DMRS) group. Each CORESET has its own identifier, that is, a CORESET ID. That transmission attributes are different may mean that CORESET IDs are different. For example, transmission attributes of a CORESET ID 1 and a CORESET ID 2 are different. The CORESET, the QCL, the format, and the DMRS group are four different types of transmission attributes. It can be learned from the second aspect that, transport blocks respectively scheduled by using at least two pieces of transmission control information can be accurately distinguished, and even if HARQs corresponding to the two transport blocks are the same, the transport blocks can still be accurately distinguished based on different transmission attributes of transmission control information in a same type of transmission attributes; and an effective feedback is provided.

With reference to the second aspect, in a first possible implementation, the N pieces of transmission control information come from P network devices, where $1 \leq P \leq N$. It can be learned from the first possible implementation of the second aspect that, regardless of whether the N pieces of transmission control information come from a single network device or different network devices, transport blocks transmitted by the network device in a same time period can be accurately distinguished. If P is greater than 1, the P network devices interact with each other, so that transmission attributes of the N pieces of transmission control information are determined; or one of the P network devices is preconfigured as a control end, and the control end allocates a transmission attribute to another network device. In this embodiment of this application, a same time period may be a same TTI, a same slot, or another time length unit.

With reference to the second aspect or the first possible implementation of the second aspect, in a second possible implementation, at least one of the N pieces of transmission control information includes a transmission resource indication, the transmission resource indication is used to indicate at least a transmission resource of the transmission feedback information, and the transmission feedback information is used to provide feedbacks specific to transport blocks scheduled by using the N pieces of transmission control information. The transmission feedback information includes an ACK response corresponding to a correctly demodulated transport block and a NACK response corresponding to an incorrectly demodulated transport block. The transmission resource indication may indicate an uplink resource used during transmission of the transmission feedback information.

With reference to the second possible implementation of the second aspect, in a third possible implementation, the method further includes: determining, according to a selection policy, a target transmission resource indication used for the transmission feedback information, where when only one of the N pieces of transmission control information includes a transmission resource indication, the selection policy is an indication policy of selecting the transmission resource indication as the target transmission resource indication; when at least two of the N pieces of transmission control information include transmission resource indications, and the at least two transmission resource indications are the same, the selection policy is an indication policy of selecting the same transmission resource indication as the target transmission resource indication: or when at least two of the N pieces of transmission control information include transmission resource indications, the selection policy is an indication policy of selecting a specified transmission resource indication as the target transmission resource indication. It can be learned from the third possible implementation of the second aspect that, if only one of N pieces of DCI carries a transmission resource indication, a transmission resource indicated by the transmission resource indication is used to provide a feedback. If the N pieces of DCI carry a same transmission resource indication, the transmission resource indication of any piece of DCI is randomly selected, and a feedback is provided based on a transmission resource indicated by the transmission resource indication. If more than one of the N pieces of DC carries a transmission resource indication, and all transmission resource indications are not the same, the target transmission resource indication may be selected according to a rule pre-established by the network device. For example, a transmission resource indication carried in DCI that is in the N pieces of DCI and that has a smallest control resource set (CORESET) identifier (ID) is specified as a target transmission resource to be used, or a transmission resource indication carried in DCI that is in DCI carrying transmission resource indications and that has a smallest CORESET ID is specified as a target transmission resource to be used. A CORESET is a time-frequency resource carrying DCI. Each CORESET has an ID, and a plurality of CORESETs may be configured on a network side. Therefore, there are a plurality of CORESET IDs. There is no same CORESET ID in a same time period. Certainly, a description is provided herein by using a smallest CORESET ID as an example. Actually, a largest CORESET ID may be used, or a specified option determined in another manner may be used. In addition, a CORESET ID is not the only identification manner, namely, using a CORESET ID. For example, a target transmission resource may alternatively be selected by using a quasi co-location (QCL) value range or a demodulation reference signal (DMRS) group identifier.

With reference to the second or the third possible implementation of the second aspect, in a fourth possible implementation, the method further includes: transmitting the transmission feedback information on a transmission resource indicated by the target transmission resource indication, where an arrangement sequence of the N feedback fields in the transmission feedback information is a sequence of transmission attributes of the N pieces of transmission control information. The transmission attribute may include a control resource set CORESET, quasi co-location (QCL), a format, or a demodulation reference signal (DMRS) group. Each type of transmission attribute has a sequence number, a value range, or a sequence identifier. For example, a CORESET ID sequence may be numbered from 1 and the number is successively incremented by 1: a CORESET 1, a CORESET 2, a CORESET 3, and so on. In this way, if there are two pieces of DCI: DCI 1 and DCI 2, a CORESET ID of the DCI 1 is a CORESET 1, the DCI 1 is used to schedule a TB 1, a CORESET ID of the DCI 2 is a CORESET 2, and the DCI 2 is used to schedule a TB 2, a transmission attribute sequence in this example is the CORESET 1→the CORESET 2. In other words, the CORESET 1 is arranged before the CORESET 2. Two feedback fields in the transmission feedback information are a first feedback field and a second feedback field, the first feedback field is sequentially arranged before the second feedback field, and a sequence of the first feedback field and the second feedback field is corresponding to a sequence of the CORESET 1 and the CORESET 2. Therefore, the first feedback field indicates a feedback specific to the TB 1, and the second feedback field indicates a feedback specific to the TB 2. For example, when a DMRS group sequence is used, the arrangement sequence of the N feedback fields in the transmission feedback information is a sequence of DMRS groups to which demodulation reference signal (DMRS) ports included in the N pieces of transmission control information belong. Each piece of DCI includes a DMRS port, and the DMRS port has been grouped into a DMRS group in advance. Therefore, one TB is corresponding to one DMRS group, each DMRS group has a number or an identifier, and all the DMRS groups have different numbers, for example, a DMRS group 1 and a DMRS group 2. Therefore, ACKs/NACKs that are in the transmission feedback fields and that are corresponding to scheduled transport blocks may be arranged based on a number sequence of the DMRS groups. Principles of other transmission attributes are basically the same as those of the CORESET ID and the DMRS group, and details are not described herein again. A feedback sequence of the feedback fields is determined based on a sequence corresponding to each of the DMRS group, the CORESET ID, the QCL, the format, or other attributes, to implement orderly feedback specific to a plurality of transport blocks without adding other fields or information for indication.

A third aspect of the embodiments of this application provides a transmission control method, including: receiving N pieces of transmission control information, where each piece of transmission control information is used to schedule one transport block and includes G transmission parameter group fields: a first transmission parameter group field to a $G^{th}$ transmission parameter group field, and only one of the G transmission parameter group fields in each piece of transmission control information is effective, where N is an integer greater than 1, and G is an integer greater than or equal to 1. To be specific, if there are two or more pieces of transmission control information, each piece of transmission control information may include only one transmission parameter group field, or certainly, may include a plurality of transmission parameter group fields; and determining a transmission scheme, where the transmission scheme is associated with a combination result of effective transmission parameter group fields in the N pieces of transmission control information. In this embodiment of the third aspect, the transmission control information may be DCI, and that the transmission scheme is associated with a combination result of effective transmission parameter group fields in the N pieces of transmission control information may be that effective transmission parameter group fields in all pieces of DCI may be identical or different. If N is greater than 2, the effective transmission parameter group fields in all the pieces of DCI may be identical or different. Alternatively, some effective transmission parameter group fields may be the same, and some effective transmission parameter group fields may be different. A transport block transmission scheme may be determined in this combination manner, thereby facilitating transport block reception.

With reference to the third aspect, in a first possible implementation, when N=2 and G=2, the determining a transmission scheme, where the transmission scheme is associated with a combination result of effective transmission parameter group fields in the N pieces of transmission control information may include: if effective transmission parameter group fields in two pieces of transmission control information are the same, a transmission scheme of two transport blocks scheduled by using the two pieces of transmission control information is a transmit diversity transmission scheme or a spatial multiplexing transmission scheme: or if effective transmission parameter group fields in two pieces of transmission control information are different, a transmission scheme of two transport blocks scheduled by using the two pieces of transmission control information is a spatial multiplexing transmission scheme or a spatial multiplexing transmission scheme. In the transmit diversity scheme, a plurality of channels can be used to carry a plurality of signal copies of same information. A receiver receives a plurality of signals and combines the plurality of signals according to a specific rule. A transmit diversity mainly reduces a bit error rate and improves transmission reliability. In the spatial division multiplexing scheme, multipath components in spatial propagation can be fully used, and a plurality of channels of different signals can be transmitted on a same time-frequency resource, thereby increasing a capacity. The spatial division multiplexing scheme mainly increases a data rate and improves spectral efficiency. It can be learned from the first possible implementation that, if both DCI 1 and DCI 2 use a first transmission parameter group field or a second transmission parameter group field, it may be determined that a transport block transmission mode is a transmit diversity mode: and if the DCI 1 uses the first transmission parameter group field, and the DCI 2 uses the second transmission parameter group field, or if the DCI 1 uses the second transmission parameter group field, and the DCI 2 uses the first transmission parameter group field, it may be determined that the transport block transmission mode is a spatial multiplexing mode. If N=3 and G=2, there are DCI 1, DCI 2, and DCI 3. If each effective transmission parameter group field in the DCI 1 and the DCI 2 is a first transmission parameter group field, and each effective transmission parameter group field in the DCI 3 is a second transmission parameter group field, a transmission scheme of two transport blocks scheduled by using the DCI 1 and the DCI 2 is the transmit diversity transmission scheme, a transmission scheme of two transport blocks scheduled by using the DCI 1 and the DCI 3 is the spatial multiplexing transmission scheme, and a transmission scheme of two transport blocks scheduled by using the DCI 2 and the DCI 3 is the spatial multiplexing transmission scheme.

With reference to the third aspect or the first possible implementation of the third aspect, in a second possible implementation, the N pieces of transmission control information come from P network devices, where $1 \leq P \leq N$. It can be learned from the second possible implementation of the third aspect that, regardless of whether the N pieces of transmission control information come from a single network device or different network devices, a transmission scheme can be determined. If P is greater than 1, the P network devices interact with each other to facilitate a coordinated transmission mode: or one of the P network devices is preconfigured as a control end, and the control end determines a transmission mode of the N pieces of transmission control information.

With reference to the third aspect, or the first or the second possible implementation of the third aspect, in a third possible implementation, at least one of the N pieces of transmission control information includes a transmission resource indication, and the transmission resource indication is used to indicate at least a transmission resource of transmission feedback information. The transmission feedback information includes an ACK response corresponding to a correctly demodulated transport block and a NACK response corresponding to an incorrectly demodulated transport block. The transmission resource indication may indicate an uplink resource used during transmission of the transmission feedback information.

With reference to the third possible implementation of the third aspect, in a fourth possible implementation, the method further includes: determining, according to a selection policy, a target transmission resource indication used for the transmission feedback information, where when only one of the N pieces of transmission control information includes a transmission resource indication, the selection policy is an indication policy of selecting the transmission resource indication as the target transmission resource indication; when at least two of the N pieces of transmission control information include transmission resource indications, and the at least two transmission resource indications are the same, the selection policy is an indication policy of selecting the same transmission resource indication as the target transmission resource indication: or when at least two of the N pieces of transmission control information include transmission resource indications, the selection policy is an indication policy of selecting a specified transmission resource indication as the target transmission resource indication. It can be learned from the fourth possible implementation of the third aspect that, if only one of N pieces of DCI carries a transmission resource indication, a transmission resource indicated by the transmission resource indication is used to provide a feedback. If the N pieces of DCI carry a same transmission resource indication, the transmission resource indication of any piece of DCI is randomly selected, and a feedback is provided based on a transmission resource indicated by the transmission resource indication. If more than one of the N pieces of DCI carries a transmission resource indication, and all transmission resource indications are not the same, the target transmission resource indication may be selected according to a rule pre-established by the network device. For example, a transmission resource indication carried in DCI that is in the N pieces of DCI and that has a smallest control resource set (CORESET) identifier (ID) is specified as a target transmission resource to be used, or a transmission resource indication carried in DCI that is in DCI carrying transmission resource indications and that has a smallest CORESET ID is specified as a target transmission resource to be used. A CORESET is a time-frequency resource carrying DCI. Each CORESET has an ID, and a plurality of CORESETs may be configured on a network side. Therefore, there are a plurality of CORESET IDs. There is no same CORESET ID in a same time period. Certainly, a description is provided herein by using a smallest CORESET ID as an example. Actually, a largest CORESET ID may be used, or a specified option determined in another manner may be used. In addition, a CORESET ID is not the only identification manner, namely, using a CORESET ID. For example, a target transmission resource may alternatively be selected by using a quasi co-location (QCL) value range or a demodulation reference signal (DMRS) group identifier.

With reference to the third or the fourth possible implementation of the third aspect, in a fifth possible implementation, the method further includes: transmitting the transmission feedback information on a transmission resource indicated by the target transmission resource indication, where an arrangement sequence of X feedback fields in the transmission feedback information is an arrangement sequence of effective transmission parameter groups in the N pieces of transmission control information, and X is an integer less than or equal to N. When effective transmission parameter group fields in Y pieces of the N pieces of transmission control information are the same, feedbacks specific to transport blocks scheduled by using the Y pieces of transmission control information are all the same, and only one feedback field is to be used to provide a feedback. When N=8 and Y=3, if the remaining five effective transmission parameter group fields are all different, and are also different from the three transmission parameter group fields, only six feedback fields are required to complete feedback.

In this case, X=6. Certainly, even if effective transmission parameter group fields of a plurality of pieces of transmission control information are the same, N feedback fields can still be used to provide a feedback. For example, when N=8 and Y=3, eight feedback fields can still be used to provide a feedback, one feedback field is still used specific to each of three same effective transmission parameter group fields, but feedback content of the feedback fields is the same.

A fourth aspect of the embodiments of this application provides a transmission control method, including: sending at least one piece of transmission control information, where the at least one piece of transmission control information is included in N pieces of transmission control information received by a terminal device: certainly, at least one may be equal to or less than N; when a quantity of pieces of transmission control information is equal to N, it indicates that the N pieces of transmission control information received by the terminal device come from one network device; and when the quantity of pieces of transmission control information is less than N, it indicates that the N pieces of transmission control information received by the terminal device come from two or more network devices, where each piece of transmission control information is used to schedule one transport block and includes F transmission parameter group fields: a first transmission parameter group field to an $F^{th}$ transmission parameter group field, only one of the F transmission parameter group fields in each piece of transmission control information is effective, and an effective transmission parameter group field in each of the N pieces of transmission control information is different from effective transmission parameter group fields in other pieces of transmission control information, where N is an integer greater than 1, and F is an integer greater than or equal to N; and receiving transmission feedback information corresponding to transport blocks respectively scheduled by using the N pieces of transmission control information, where the transmission feedback information includes N feedback fields: a first feedback field to an $N^{th}$ feedback field, and an $M^{th}$ feedback field is used to provide a feedback specific to a transport block scheduled by using transmission control information that is in the N pieces of transmission control information and in which an effective transmission parameter group field is a $Q^{th}$ transmission parameter group field, where M is an integer, 1≤M≤N, Q is an integer, and 1≤Q≤F. It should be noted that the $M^{th}$ feedback field in the N feedback fields in the transmission feedback information is not used to indicate an arrangement sequence number of the feedback field in the N feedback fields. For example, if N=8, M=3, and Q=2, a third feedback field may be used to provide a feedback specific to a transport block scheduled by using transmission control information that is in eight pieces of transmission control information and in which an effective transmission parameter group field is a second transmission parameter group field, and the third feedback field may be the seventh feedback field in eight feedback fields arranged sequentially. In addition, in this embodiment of the fourth aspect, the transmission control information may be DCI. For example, if N=2, there are two pieces of transmission control information. If the two pieces of transmission control information are represented by DCI, the two pieces of transmission control information include DCI 1 and DCI 2. In this case, the DCI 1 and the DCI 2 each include two transmission parameter group fields. The two transmission parameter group fields may be referred to as a first transmission parameter group field and a second transmission parameter group field, or may be referred to as a transmission parameter group field 1 and a transmission parameter group field 2. Only one transmission parameter group field in each of the DCI 1 and the DCI 2 is effective, and effective transmission parameter group fields in the DCI 1 and the DCI 2 are different. In other words, if a first transmission parameter group field in the DCI 1 is effective, a second transmission parameter group field in the DCI 2 is effective; or if a second transmission parameter group field in the DCI 1 is effective, a first transmission parameter group field in the DCI 2 is effective. A transmission parameter group field may be a transport block configuration information field in DCI. The DCI may include two or more transport block configuration information fields. Each transport block configuration information field includes the following parameters: a modulation and coding scheme (MCS), a new data indicator (NDI), and a redundancy version (RV). In this way, a transport block to be scheduled by using the DCI may be scheduled by using the field that includes the MCS, the NDI, and the RV and that is in the DCI. It can be learned from the fourth aspect that, according to an indication manner configured by the network device in DCI, the terminal device can accurately distinguish between transport blocks scheduled by using at least two pieces of transmission control information, and even if HARQs corresponding to the two transport blocks are the same, the two transport blocks can still be accurately distinguished based on different effective transmission parameter group fields; and an effective feedback is provided.

With reference to the fourth aspect, in a first possible implementation, at least one of the N pieces of transmission control information includes a transmission resource indication, the transmission resource indication is used to indicate at least a transmission resource of the transmission feedback information, and the transmission feedback information is used to provide feedbacks specific to transport blocks scheduled by using the N pieces of transmission control information. The transmission feedback information includes an ACK response corresponding to a correctly demodulated transport block and a NACK response corresponding to an incorrectly demodulated transport block. The transmission resource indication may indicate an uplink resource used during transmission of the transmission feedback information.

With reference to the first possible implementation of the fourth aspect, in a second possible implementation, the receiving feedback information corresponding to the N pieces of transmission control information may include: receiving the transmission feedback information on a transmission resource indicated by the target transmission resource indication; and an arrangement sequence of the N feedback fields in the transmission feedback information is a sequence of transmission attributes of the N pieces of transmission control information. The transmission attribute may include a control resource set CORESET, quasi co-location (QCL), a format, or a demodulation reference signal (DMRS) group. Each type of transmission attribute has a sequence number or a sequence identifier. For example, a CORESET ID sequence may be numbered from 1 and the number is successively incremented by 1: a CORESET 1, a CORESET 2, a CORESET 3, and so on. In this way, if there are two pieces of DCI: DCI 1 and DCI 2, a CORESET ID of the DCI 1 is a CORESET 1, the DCI 1 is used to schedule a TB 1, a CORESET ID of the DCI 2 is a CORESET 2, and the DCI 2 is used to schedule a TB 2, a transmission attribute sequence in this example is the CORESET 1→the CORESET 2. In other words, the CORESET 1 is arranged before the CORESET 2. Two feedback fields in the transmission feedback information are a first feedback field and a second feedback field, the first feedback field is sequentially arranged before the second feedback field, and a sequence of the first feedback field and the second feedback field is corresponding to a sequence of the CORESET 1 and the CORESET 2. Therefore, the first feedback field indicates a feedback specific to the TB 1, and the second feedback field indicates a feedback specific to the TB 2. For example, when a DMRS group sequence is used, the arrangement sequence of the N feedback fields in the transmission feedback information is a sequence of DMRS groups to which demodulation reference signal (DMRS) ports included in the N pieces of transmission control information belong. Each piece of DC includes a DMRS port, and the DMRS port has been grouped into a DMRS group in advance. Therefore, one TB is corresponding to one DMRS group, each DMRS group has a number or an identifier, and all the DMRS groups have different numbers, for example, a DMRS group 1 and a DMRS group 2. Therefore, ACKs/NACKs that are in the transmission feedback fields and that are corresponding to scheduled transport blocks may be arranged based on a number sequence of the DMRS groups. Principles of other transmission attributes are basically the same as those of the CORESET ID and the DMRS group, and details are not described herein again. A feedback sequence of the feedback fields is determined based on a sequence corresponding to each of the DMRS group, the CORESET ID, the QCL, the format, or other attributes, to implement orderly feedback specific to a plurality of transport blocks without adding other fields or information for indication.

Certainly, optionally, the arrangement sequence of the N feedback fields in the transmission feedback information may be an arrangement sequence of effective transmission parameter group fields in the N pieces of transmission control information. Each piece of transmission control information includes F transmission parameter group fields: the first transmission parameter group field to the $F^{th}$ transmission parameter group field. The transmission parameter group fields can be understood as being arranged sequentially. For example, the first transmission parameter group field occupies the $9^{th}$ to $12^{th}$ bits in the transmission control information, the second transmission parameter group field occupies the $13^{th}$ to $15^{th}$ bits in the transmission control information, and other transmission parameter group fields may be sequentially arranged after the bits. The arrangement sequence of the effective transmission parameter group fields is an arrangement sequence of locations of all the effective transmission parameter group fields in transmission control information in which the effective transmission parameter group fields are located. For example, there are two pieces of transmission control information: DCI 1 and DCI 2. The DCI 1 is used to schedule a TB 2, and the DCI 2 is used to schedule a TB 1. The DCI 1 includes a first transmission parameter group field and a second transmission parameter group field that are arranged sequentially, and an effective transmission parameter group field in the DCI 1 is the first transmission parameter group field. The DCI 2 includes a first transmission parameter group field and a second transmission parameter group field that are arranged sequentially, and an effective transmission parameter group field in the DCI 2 is the second transmission parameter group field. Two feedback fields in the transmission feedback information are a first feedback field and a second feedback field, the first feedback field is sequentially arranged before the second feedback field, the first feedback field is corresponding to a transport block scheduled by using DCI whose effective transmission parameter group field is the first transmission parameter group field; and the second feedback field is corresponding to a transport block scheduled by using DCI whose effective transmission parameter group field is the second transmission parameter group field. Therefore, the first feedback field indicates a feedback specific to the TB 2 scheduled by using the DCI 1, and the second feedback field indicates a feedback specific to the TB 1 scheduled by using the DCI 2.

A fifth aspect of the embodiments of this application provides a transmission control method, including: sending at least one piece of transmission control information, where the at least one piece of transmission control information is included in N pieces of transmission control information received by a terminal device; certainly, at least one may be equal to or less than N; when a quantity of pieces of transmission control information is equal to N, it indicates that the N pieces of transmission control information received by the terminal device come from one network device; and when the quantity of pieces of transmission control information is less than N, it indicates that the N pieces of transmission control information received by the terminal device come from two or more network devices, where each piece of transmission control information is used to schedule one transport block, a transmission attribute of each of the N pieces of transmission control information is one of a first transmission attribute to an $N^{th}$ transmission attribute in a same type of transmission attributes, and a transmission attribute of any piece of transmission control information is different from transmission attributes of other pieces of transmission control information, where N is an integer greater than 1; and receiving transmission feedback information corresponding to transport blocks respectively scheduled by using the N pieces of transmission control information, where the transmission feedback information includes N feedback fields: a first feedback field to an $N^{th}$ feedback field, and an $M^{th}$ feedback field is used to provide a feedback specific to a transport block scheduled by using transmission control information that is in the N pieces of transmission control information and whose transmission attribute is a $Q^{th}$ transmission attribute, where M is an integer, Q is an integer, $1 \leq M \leq N$, and $1 \leq Q \leq N$. It should be noted that the $M^{th}$ feedback field in the N feedback fields in the transmission feedback information is not used to indicate an arrangement sequence number of the feedback field in the N feedback fields. For example, if N=8, M=3, and Q=2, a third feedback field may be used to provide a feedback specific to a transport block scheduled by using transmission control information that is in eight pieces of transmission control information and whose transmission attribute is a second transmission attribute, and the third feedback field may be the seventh feedback field in eight feedback fields arranged sequentially. In addition, in this embodiment of the fifth aspect, the transmission control information may be DCI, and that transmission attributes are different may mean that for a same type of transmission attribute, numbers are different, identifiers are different, or ranges are different. For example, the transmission attribute may include a control resource set CORESET, quasi co-location (QCL), a format, or a demodulation reference signal (DMRS) group. Each CORESET has its own identifier, that is, a CORESET ID. That transmission attributes are different may mean that CORESET IDs are different. For example, transmission attributes of a CORESET ID 1 and a CORESET ID 2 are different. The CORESET, the QCL, the format, and the DMRS group are four different types of transmission attributes. It can be learned from the fifth aspect that, according to an indication manner configured by the network device, the terminal device can accurately distinguish between transport blocks scheduled by using at least two pieces of transmission control information, and even if HARQs corresponding to the two transport blocks are the same, the two transport blocks can still be accurately distinguished based on different transmission attributes of transmission control information in a same type of transmission attributes: and an effective feedback is provided.

With reference to the fifth aspect, in a first possible implementation, at least one of the N pieces of transmission control information includes a transmission resource indication, the transmission resource indication is used to indicate at least a transmission resource of the transmission feedback information, and the transmission feedback information is used to provide feedbacks specific to transport blocks scheduled by using the N pieces of transmission control information. The transmission feedback information includes an ACK response corresponding to a correctly demodulated transport block and a NACK response corresponding to an incorrectly demodulated transport block. The transmission resource indication may indicate an uplink resource used during transmission of the transmission feedback information.

With reference to the first possible implementation of the fifth aspect, in a second possible implementation, the receiving feedback information corresponding to the N pieces of transmission control information may include: receiving the transmission feedback information on a transmission resource indicated by the target transmission resource indication: and an arrangement sequence of the N feedback fields in the transmission feedback information is a sequence of transmission attributes of the N pieces of transmission control information. The transmission attribute may include a control resource set CORESET, quasi co-location (QCL), a format, or a demodulation reference signal (DMRS) group. Each type of transmission attribute has a sequence number or a sequence identifier. For example, a CORESET ID sequence may be numbered from 1 and the number is successively incremented by 1: a CORESET 1, a CORESET 2, a CORESET 3, and so on. In this way, if there are two pieces of DCI: DCI 1 and DCI 2, a CORESET ID of the DCI 1 is a CORESET 1, the DCI 1 is used to schedule a TB 1, a CORESET ID of the DCI 2 is a CORESET 2, and the DCI 2 is used to schedule a TB 2, a transmission attribute sequence in this example is the CORESET 1→the CORESET 2. In other words, the CORESET 1 is arranged before the CORESET 2. Two feedback fields in the transmission feedback information are a first feedback field and a second feedback field, the first feedback field is sequentially arranged before the second feedback field, and a sequence of the first feedback field and the second feedback field is corresponding to a sequence of the CORESET 1 and the CORESET 2. Therefore, the first feedback field indicates a feedback specific to the TB 1, and the second feedback field indicates a feedback specific to the TB 2. For example, when a DMRS group sequence is used, the arrangement sequence of the N feedback fields in the transmission feedback information is a sequence of DMRS groups to which demodulation reference signal (DMRS) ports included in the N pieces of transmission control information belong. Each piece of DCI includes a DMRS port, and the DMRS port has been grouped into a DMRS group in advance. Therefore, one TB is corresponding to one DMRS group, each DMRS group has a number or an identifier, and all the DMRS groups have different numbers, for example, a DMRS group 1 and a DMRS group 2. Therefore, ACKs/NACKs that are in the transmission feedback fields and that are corresponding to scheduled transport blocks may be arranged based on a number sequence of the DMRS groups. Principles of other transmission attributes are basically the same as those of the CORESET ID and the DMRS group, and details are not described herein again. A feedback sequence of the feedback fields is determined based on a sequence corresponding to each of the DMRS group, the CORESET ID, the QCL, the format, or other attributes, to implement orderly feedback specific to a plurality of transport blocks without adding other fields or information for indication.

A sixth aspect of this application provides a transmission control method, including: generating at least one piece of transmission control information; and sending the at least one piece of transmission control information, where the at least one piece of transmission control information is included in N pieces of transmission control information received by a terminal device, the N pieces of transmission control information are used by the terminal device to determine a transmission scheme, and the transmission scheme is associated with a combination result of effective transmission parameter group fields in the N pieces of transmission control information: each piece of transmission control information is used to schedule one transport block and includes G transmission parameter group fields: a first transmission parameter group field to a G transmission parameter group field; and only one of the G transmission parameter group fields in each piece of transmission control information is effective, where N is an integer greater than 1, and G is an integer greater than or equal to 1. The transmission control information may be DCI, and that the transmission scheme is associated with a combination result of effective transmission parameter group fields in the N pieces of transmission control information may be that effective transmission parameter group fields in all pieces of DCI may be identical or different. If N is greater than 2, the effective transmission parameter group fields in all pieces of the DCI may be identical or different. Alternatively, some effective transmission parameter group fields may be the same, and some effective transmission parameter group fields may be different. A transport block transmission scheme may be determined in this combination manner.

A seventh aspect of this application provides a terminal device, where the terminal device includes a receiving unit, a processing unit, and a sending unit. The receiving unit is configured to perform the step of the receiving operation in the first aspect, the second aspect, or the third aspect and any possible implementation of the first aspect, the second aspect, or the third aspect. The processing unit is configured to perform the step of the processing operation in the first aspect, the second aspect, or the third aspect and any possible implementation of the first aspect, the second aspect, or the third aspect. The sending unit is configured to perform the step of the sending operation in the first aspect, the second aspect, or the third aspect and any possible implementation of the first aspect, the second aspect, or the third aspect.

A seventh aspect of this application provides a network device, where the network device includes a receiving unit and a sending unit. The receiving unit is configured to perform the step of the receiving operation in the fourth aspect, the fifth aspect, or the sixth aspect and any possible implementation of the fourth aspect, the fifth aspect, or the sixth aspect. The sending unit is configured to perform the step of the sending operation in the fourth aspect, the fifth aspect, or the sixth aspect and any possible implementation of the fourth aspect, the fifth aspect, or the sixth aspect. The network device may further include a processing unit, where the processing unit is configured to perform a step of determining each piece of transmission control information before the sending unit sends the transmission control information.

An eighth aspect of this application provides a terminal device, where the terminal device includes a transceiver and at least one processor; the transceiver and the at least one processor are connected to each other through a line; the transceiver is configured to perform the information receiving and sending operations on the terminal device side in the first aspect, the second aspect, or the third aspect and any possible implementation of the first aspect, the second aspect, or the third aspect; the information receiving and sending operations herein may be operations of receiving transmission control information and sending transmission feedback information in the first aspect, the second aspect, or the third aspect and any possible implementation of the first aspect, the second aspect, or the third aspect; and the processor is configured to perform the information processing operation on the terminal device side in the first aspect, the second aspect, or the third aspect and any possible implementation of the first aspect, the second aspect, or the third aspect, for example, the operation of generating the transmission feedback information. Optionally, the terminal device may further include a memory, where the memory stores an instruction, and the memory is connected to the transceiver and the at least one processor through a line.

A ninth aspect of this application provides a network device, where the network device includes a transceiver and at least one processor; the transceiver and the at least one processor are connected to each other through a line; the transceiver is configured to perform the information receiving and sending operations on the network device side in the fourth aspect, the fifth aspect, or the sixth aspect and any possible implementation of the fourth aspect, the fifth aspect, or the sixth aspect; the information receiving and sending operations may be operations of sending transmission control information and receiving transmission feedback information in the fourth aspect, the fifth aspect, or the sixth aspect and any possible implementation of the fourth aspect, the fifth aspect, or the sixth aspect: and the processor is configured to perform the information processing operation on the network device side in the fourth aspect, the fifth aspect, or the sixth aspect and any possible implementation of the fourth aspect, the fifth aspect, or the sixth aspect. For example, the information processing operation may be the operation of determining the transmission control information before sending the transmission control information. Optionally, the network device may further include a memory, where the memory stores an instruction, and the memory is connected to the transceiver and the at least one processor through a line.

A tenth aspect of this application provides a system on chip, where the system on chip is applied to a terminal device and includes at least one processor and a communications interface; the system on chip may further include a memory: the memory, the communications interface, and the at least one processor are connected to each other through a line; the at least one memory stores an instruction: and the instruction is executed by the processor to perform the operation of the terminal device in the first aspect, the second aspect, or the third aspect and any possible implementation of the first aspect, the second aspect, or the third aspect.

An eleventh aspect of this application provides a system on chip, where the system on chip is applied to a network device and includes at least one processor and a communications interface; the system on chip may further include a memory; the memory, the communications interface, and the at least one processor are connected to each other through a line; the at least one memory stores an instruction; and the instruction is executed by the processor to perform the operation of the network device in the fourth aspect, the fifth aspect, or the sixth aspect and any possible implementation of the fourth aspect, the fifth aspect, or the sixth aspect.

A twelfth aspect of this application provides a computer-readable storage medium, where the computer-readable storage medium is applied to a terminal device. The computer-readable storage medium stores an instruction, and when the instruction is run on a computer, the computer is enabled to perform the method in the first aspect, the second aspect, or the third aspect and any possible implementation of the first aspect, the second aspect, or the third aspect.

A thirteenth aspect of this application provides a computer-readable storage medium, where the computer-readable storage medium is applied to a network device. The computer-readable storage medium stores an instruction, and when the instruction is run on a computer, the computer is enabled to perform the method in the fourth aspect, the fifth aspect, or the sixth aspect and any possible implementation of the fourth aspect, the fifth aspect, or the sixth aspect.

A fourteenth aspect of this application provides a computer program product including an instruction, where the computer program product is applied to a terminal device. When the program is run on a computing device, the operation of the terminal device in the first aspect, the second aspect, or the third aspect and any possible implementation of the first aspect, the second aspect, or the third aspect is performed.

A fifteenth aspect of this application provides a computer program product including an instruction, where the computer program product is applied to a network device. When the program is run on a computing device, the operation of the network device in the fourth aspect, the fifth aspect, or the sixth aspect and any possible implementation of the fourth aspect, the fifth aspect, or the sixth aspect is performed.

Still another aspect of this application provides a communications system, including a terminal device and a network device, where the terminal device is a terminal device that performs the steps in the first aspect, the second aspect, or the third aspect and any possible implementation of the first aspect, the second aspect, or the third aspect; and the network device is a network device that performs the steps in the fourth aspect, the fifth aspect, or the sixth aspect and any possible implementation of the fourth aspect, the fifth aspect, or the sixth aspect.

According to the transmission control method provided in the embodiments of this application, the network device may send the N pieces of transmission control information to the terminal device, and the terminal device can accurately distinguish, based on the effective transmission parameter group fields or the transmission attributes of the N pieces of transmission control information, between the transport blocks respectively scheduled by using the N pieces of transmission control information, and provide an effective feedback.

DESCRIPTION OF EMBODIMENTS

Figure 1A:
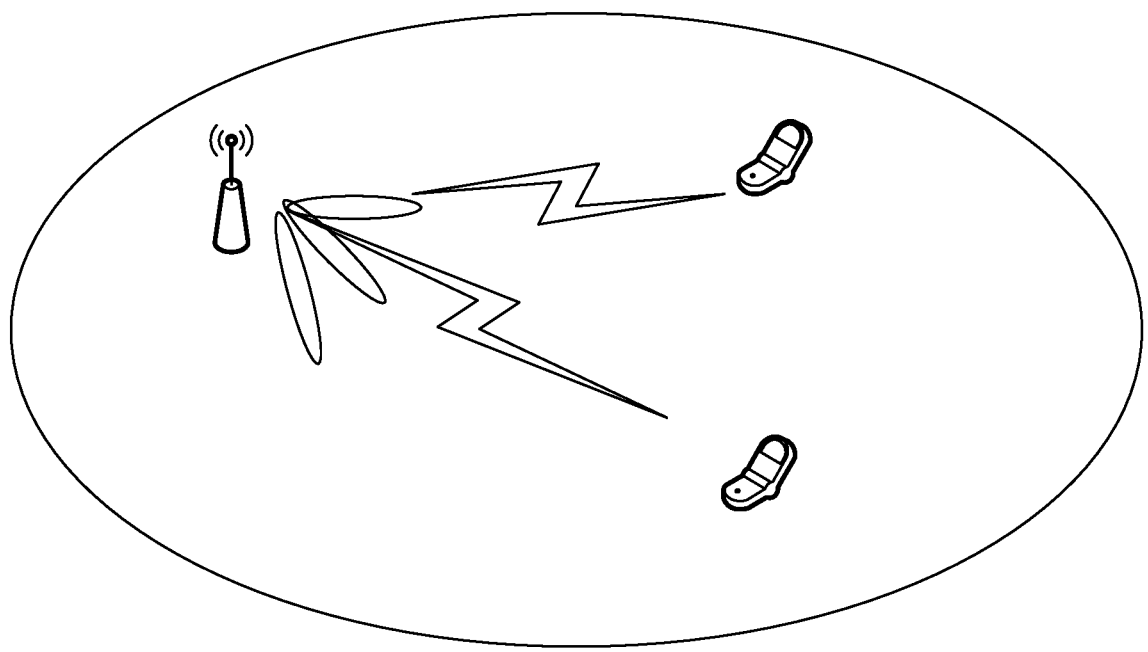
FIG. 1A is a schematic diagram of an embodiment of a communications system according to an embodiment of this application.

The following describes technical solutions in embodiments of this application with reference to the accompanying drawings in the embodiments of this application. Apparently, the described embodiments are merely a part rather than all of the embodiments of this application. A person of ordinary skill in the art can learn that as technologies develop and a new service scenario emerges, the technical solutions provided in the embodiments of this application are also applicable to a similar technical issue.

An embodiment of this application provides a transmission control method, to accurately distinguish between transport blocks respectively scheduled by using at least two pieces of transmission control information, and provide an effective feedback. Embodiments of this application further provide a corresponding terminal device and network device, a system, and a computer-readable storage medium. The following separately provides detailed descriptions.

Terms "uplink" and "downlink" in this application are used to describe transmission directions of data/information in some scenarios. For example, an "uplink" direction is a direction of transmitting the data/information from a terminal device to a network side, and a "downlink" direction is a direction of transmitting data/information from the network side device to the terminal device. "Uplink" and "downlink" are only used to describe directions, and specific devices from/to which the data/information is transmitted are not limited.

The term "and/or" in this application may be an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

In the specification, claims, and accompanying drawings of this application, terms "first", "second", and the like are intended to distinguish between similar objects but do not necessarily indicate a specific order or sequence. It should be understood that the terms used in such a way are interchangeable in proper circumstances so that the embodiments of the present subject matter described herein can be implemented in orders different from the order illustrated or described herein. Moreover, terms "include", "have" and any other variant thereof is intended to cover a non-exclusive inclusion. For example, a process, a method, a system, a product, or a device that includes a series of steps or modules is not necessarily limited to expressly listing those steps or modules, but may include other steps or modules not expressly listed or inherent to the process, the method, the system, the product, or the device. Names or numbers of steps in this application do not mean that the steps in the method procedure are to be performed in a time/logical sequence indicated by the names or numbers. An execution sequence of the steps in the procedure that have been named or numbered can be changed based on a technical objective to be achieved, provided that same or similar technical effects can be achieved. Module division in this application is logical division and may be another division during implementation in actual application. For example, a plurality of modules may be combined or integrated into another system, or some features may be ignored or not be performed. In addition, the displayed or discussed mutual couplings or direct couplings or communication connections may be implemented through some interfaces. The indirect couplings or communication connections between the modules may be implemented in electrical or other similar forms. This is not limited to this application. In addition, modules or submodules described as separate components may be or may not be physically separated, or may be or may not be physical modules, or may be distributed on a plurality of circuit modules. The objectives of the solutions of this application may be achieved by selecting some or all of the modules based on actual demands.

FIG. 1A is a schematic diagram of an embodiment of a communications system according to an embodiment of this application.

As shown in FIG. 1A, the communications system includes a network device and a terminal device.

In this embodiment of this application, the network device is an apparatus that is deployed in a radio access network to provide a wireless communication function for the terminal device. The network device may include a macro base station, a micro base station (also referred to as a small cell), a relay station, an access point, and the like in various forms. In a system in which different radio access technologies are used, a device having a base station function may be termed differently. For example, the device is referred to as an evolved NodeB (eNB or eNodeB) in an LTE system, a NodeB in a 3rd generation (3G) system, a wireless network access device in a 5th generation (5G) system, or the like. For ease of description, in all the embodiments of this application, all the foregoing apparatuses that provide a wireless communication function for the terminal are referred to as a network device or a base station or a BS.

The terminal device in the embodiments of this application may include various handheld devices, vehicle-mounted devices, wearable devices, or computing devices that have a wireless communication function, or other processing devices connected to a wireless modem. The terminal may be a mobile station (MS), a subscriber unit, a cellular phone, a smartphone, a wireless data card, a personal digital assistant (PDA) computer, a tablet computer, a wireless modem, a handheld device (handset), a laptop computer, a machine type communication (MTC) terminal, or the like.

FIG. 1A shows a scenario in which one network device schedules transmission control information to a plurality of terminal devices. Actually, alternatively, a plurality of network devices may schedule transmission control information to one terminal device, as shown in FIG. 1B.

Figure 1B:
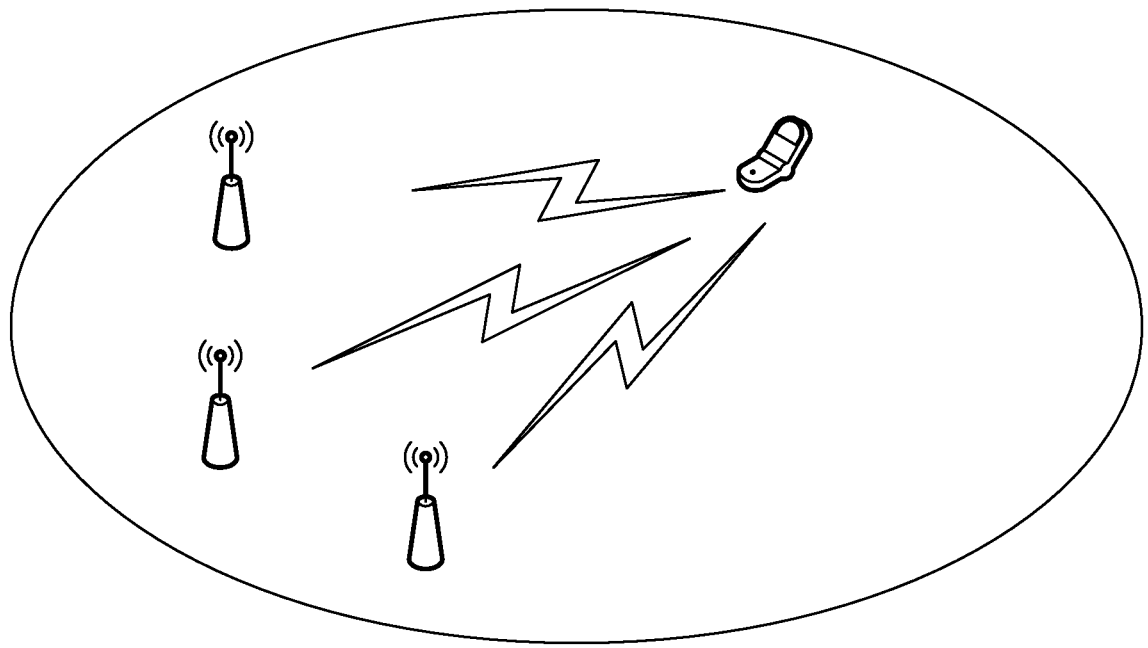
FIG. 1B is a schematic diagram of an embodiment of a communications system according to an embodiment of this application.
Figure 2:
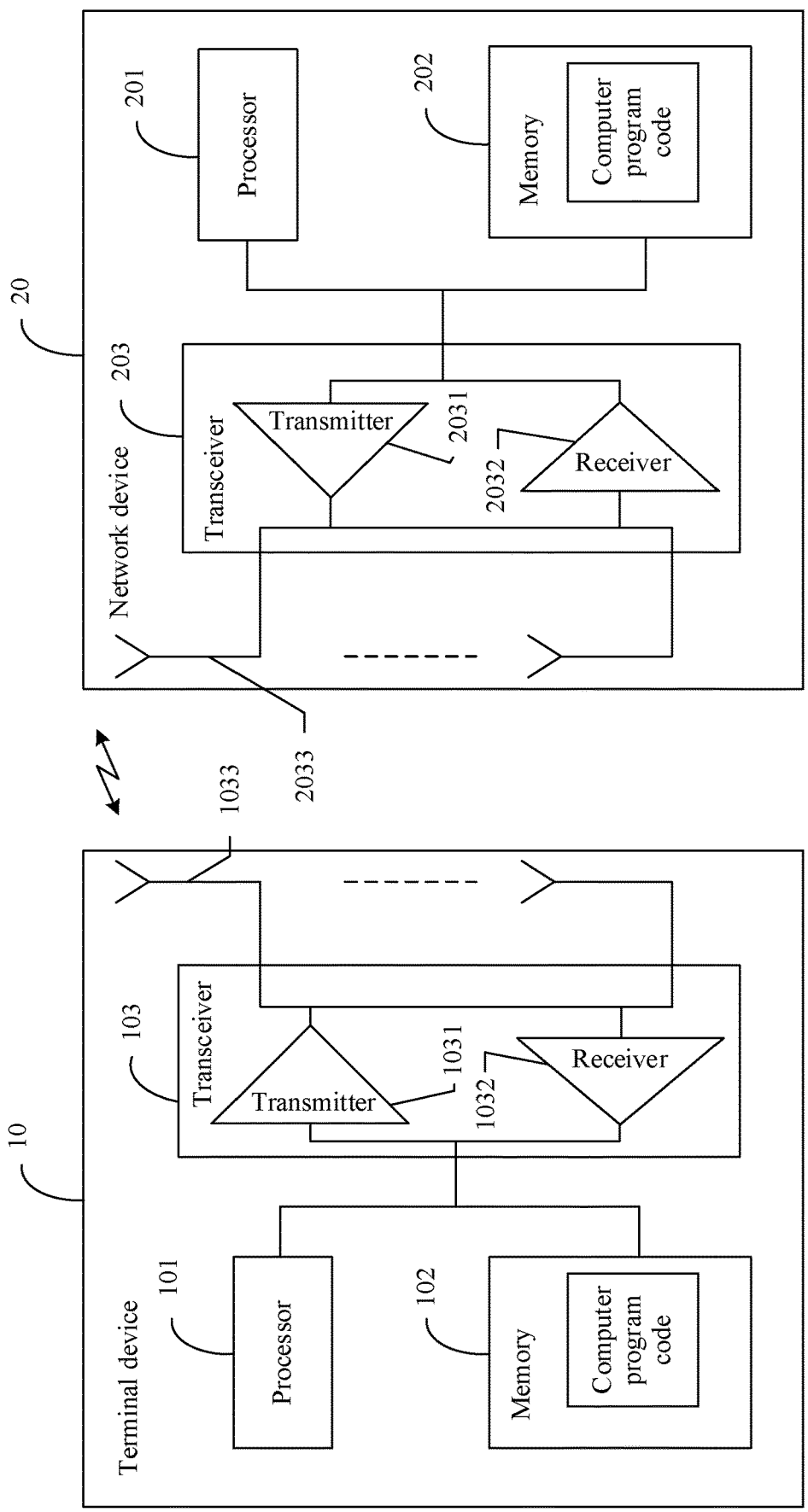
FIG. 2 is a schematic diagram of another embodiment of a communications system according to an embodiment of this application.

Communication between each network device and each terminal device in each communications system shown in FIG. 1A and FIG. 1B may alternatively be represented in another form. As shown in FIG. 2, a terminal device 10 includes a processor 101, a memory 102, and a transceiver 103, and the transceiver 103 includes a transmitter 1031, a receiver 1032, and an antenna 1033. A network device 20 includes a processor 201, a memory 202, and a transceiver 203, and the transceiver 203 includes a transmitter 2031, a receiver 2032, and an antenna 2033. The receiver 1032 may be configured to receive transmission control information by using the antenna 1033, and the transmitter 1031 may be configured to send transmission feedback information to the network device 20 by using the antenna 1033. The transmitter 2031 may be configured to send the transmission control information to the terminal device 10 by using the antenna 2033, and the receiver 2032 may be configured to receive, by using the antenna 2033, the transmission feedback information sent by the terminal device 10.

The foregoing describes structures of the communications system, the terminal device, and the network device. The following describes a transmission control process between a terminal device and a network device.

Figure 3:
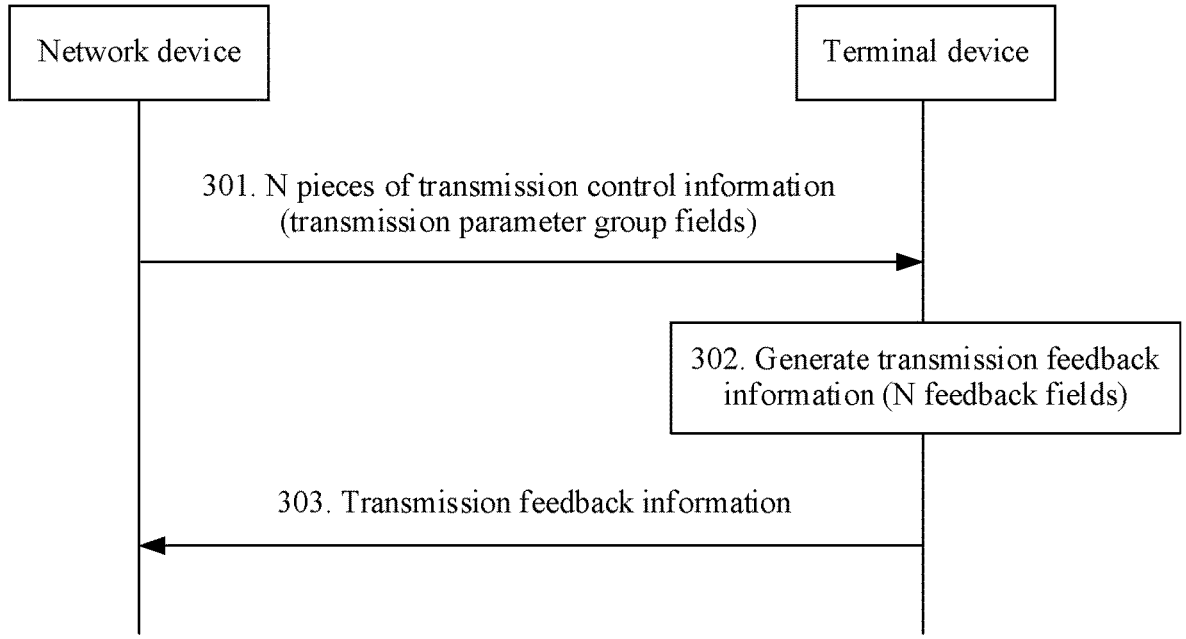
FIG. 3 is a schematic diagram of an embodiment of a transmission control method according to an embodiment of this application.

As shown in FIG. 3, an embodiment of a transmission control method according to an embodiment of this application includes the following steps.

301. A terminal device receives N pieces of transmission control information sent by a network device.

Each piece of transmission control information is used to schedule one transport block and includes F transmission parameter group fields: a first transmission parameter group field to an $F^{th}$ transmission parameter group field, only one of the F transmission parameter group fields in each piece of transmission control information is effective, and an effective transmission parameter group field in each of the N pieces of transmission control information is different from effective transmission parameter group fields in other pieces of transmission control information, where N is an integer greater than 1, and F is an integer greater than or equal to N.

The N pieces of transmission control information received by the terminal device may come from a single network device, or may come from two or more network devices.

F may be greater than N. or F may be equal to N. For example, N=5, and F=5. In other words, the network device sends five pieces of transmission control information to the terminal device, and each piece of transmission control information includes five transmission parameter group fields. For example, N=2, and F=2. In other words, the network device sends two pieces of transmission control information to the terminal device, and each piece of transmission control information includes two transmission parameter group fields. The transmission control information may be DCI. For example, if N=2 and F=2, there are two pieces of transmission control information. If the two pieces of transmission control information are represented by DCI, the two pieces of transmission control information include DCI 1 and DCI 2. In this case, the DCI 1 and the DCI 2 each include two transmission parameter group fields. The two transmission parameter group fields may be referred to as a first transmission parameter group field and a second transmission parameter group field, or may be referred to as a transmission parameter group field 1 and a transmission parameter group field 2. Only one transmission parameter group field in each of the DCI 1 and the DCI 2 is effective, and effective transmission parameter group fields in the DCI 1 and the DCI 2 are different. In other words, if a first transmission parameter group field in the DCI 1 is effective, a second transmission parameter group field in the DCI 2 is effective; or if a second transmission parameter group field in the DCI 1 is effective, a first transmission parameter group field in the DCI 2 is effective. A transmission parameter group field may be a transport block configuration information field in DCI. The DCI may include two or more transport block configuration information fields. Each transport block configuration information field includes the following parameters: a modulation and coding scheme (MCS), a new data indicator (NDI), and a redundancy version (RV). In this way, a transport block to be scheduled by using the DCI may be scheduled by using the field that includes the MCS, the NDI and the RV and that is in the DCI.

302. After receiving the N pieces of transmission control information, the terminal device generates transmission feedback information specific to the N pieces of transmission control information.

The transmission feedback information includes N feedback fields: a first feedback field to an $N^{th}$ feedback field, and an $M^{th}$ feedback field is used to provide a feedback specific to a transport block scheduled by using transmission control information that is in the N pieces of transmission control information and in which an effective transmission parameter group field is a $Q^{th}$ transmission parameter group field, where M is an integer, $1 \leq M \leq N$, Q is an integer, and $1 \leq Q \leq F$.

It should be noted that the $M^{th}$ feedback field in the N feedback fields in the transmission feedback information may not be used to indicate an arrangement sequence number of the feedback field in the N feedback fields. For example, if N=8, M=3, and Q=2, a third feedback field may be used to provide a feedback specific to a transport block scheduled by using transmission control information that is in eight pieces of transmission control information and in which an effective transmission parameter group field is a second transmission parameter group field, and the third feedback field may be the seventh feedback field in eight feedback fields arranged sequentially.

Certainly, optionally, an arrangement sequence of the N feedback fields in the transmission feedback information may be an arrangement sequence of effective transmission parameter group fields in the N pieces of transmission control information. Each piece of transmission control information includes F transmission parameter group fields: the first transmission parameter group field to the $F^{th}$ transmission parameter group field. The transmission parameter group fields can be understood as being arranged sequentially. For example, the first transmission parameter group field occupies the $9^{th}$ to $12^{th}$ bits in the transmission control information, the second transmission parameter group field occupies the $13^{th}$ to $15^{th}$ bits in the transmission control information, and other transmission parameter group fields may be sequentially arranged after the bits. The arrangement sequence of the effective transmission parameter group fields is an arrangement sequence of locations of all the effective transmission parameter group fields in transmission control information in which the effective transmission parameter group fields are located. For example, there are two pieces of transmission control information: DCI 1 and DCI 2. The DCI 1 is used to schedule a TB 2, and the DCI 2 is used to schedule a TB 1. The DCI 1 includes a first transmission parameter group field and a second transmission parameter group field that are arranged sequentially, and an effective transmission parameter group field in the DCI 1 is the first transmission parameter group field. The DCI 2 includes a first transmission parameter group field and a second transmission parameter group field that are arranged sequentially, and an effective transmission parameter group field in the DCI 2 is the second transmission parameter group field. Two feedback fields in the transmission feedback information are a first feedback field and a second feedback field, the first feedback field is sequentially arranged before the second feedback field, the first feedback field is corresponding to a transport block scheduled by using DCI whose effective transmission parameter group field is the first transmission parameter group field; and the second feedback field is corresponding to a transport block scheduled by using DCI whose effective transmission parameter group field is the second transmission parameter group field. Therefore, the first feedback field indicates a feedback specific to the TB 2 scheduled by using the DCI 1, and the second feedback field indicates a feedback specific to the TB 1 scheduled by using the DCI 2.

In a specific implementation process, the arrangement sequence of the N feedback fields in the transmission feedback information, an arrangement sequence of the F transmission parameter group fields, and other arrangement sequences may be set depending on a specific requirement. There may be various mapping relationships between the arrangement sequences, and specific implementation details thereof are not limited to this embodiment of the present subject matter.

That two pieces of control information are used to schedule two transport blocks is used as an example to describe determination of a correspondence between a feedback field and a transport block by using the arrangement sequence of the effective transmission parameter group fields. Table 1 is a relationship table about a 2-bit ACK/NACK feedback. Table 2 is a relationship table about a 3-bit ACK/NACK feedback.

TABLE 1

Correspondence between a feedback field and a transport block

| ACK/NACK | Meaning |
|---|---|
| 11 | A transport block 1 is corresponding to an ACK, and a transport block 2 is corresponding to an ACK |
| 10 | The transport block 1 is corresponding to an ACK, and the transport block 2 is corresponding to a NACK or DTX |
| 01 | The transport block 1 is corresponding to a NACK or DTX, and the transport block 2 is corresponding to an ACK |
| 00 | The transport block 1 is corresponding to a NACK or DTX, and the transport block 2 is corresponding to a NACK or DTX |

A first transmission parameter group field is correspondingly use to schedule the transport block 1, and a second transmission parameter group field is correspondingly used to schedule the transport block 2. DTX indicates that the terminal device does not find the control information.

TABLE 2

Correspondence between a feedback field and a transport block

| ACK/NACK | Meaning |
|---|---|
| 111 | A transport block 1 is corresponding to an ACK, and a transport block 2 is corresponding to an ACK |

TABLE 2-continued

Correspondence between a feedback field and a transport block

| ACK/NACK | Meaning |
|---|---|
| 110 | The transport block 1 is corresponding to an ACK, and the transport block 2 is corresponding to a NACK |
| 101 | The transport block 1 is corresponding to a NACK, and the transport block 2 is corresponding to an ACK |
| 100 | The transport block 1 is corresponding to a NACK, and the transport block 2 is corresponding to a NACK |
| 011 | The transport block 1 is corresponding to an ACK, and the transport block 2 is corresponding to DTX |
| 010 | The transport block 1 is corresponding to DTX, and the transport block 2 is corresponding to an ACK |
| 001 | The transport block 1 is corresponding to a NACK, and the transport block 2 is corresponding to DTX |
| 000 | The transport block 1 is corresponding to DTX, and the transport block 2 is corresponding to a NACK |

A first transmission parameter group field is correspondingly used to schedule the transport block 1, and a second transmission parameter group field is correspondingly used to schedule the transport block 2. DTX indicates that the terminal device does not find the control information.

303. The terminal device sends the transmission feedback information to the network device.

It can be learned from this embodiment that, transport blocks respectively scheduled by using at least two pieces of transmission control information can be accurately distinguished, and even if HARQ IDs corresponding to the two transport blocks are the same, the transport blocks can still be accurately distinguished based on different effective transmission parameter group fields; and an effective feedback is provided.

Optionally, actually, the N pieces of transmission control information in the embodiment corresponding to FIG. 3 may come from P network devices, where 1≤P≤N. In this embodiment of this application, regardless of whether the N pieces of transmission control information come from a single network device or different network devices, transport blocks transmitted by the network device in the same time period can be accurately distinguished. If P is greater than 1, the P network devices interact with each other, so that an effective transmission parameter group field in each of the N pieces of transmission control information is determined; or one of the P network devices is preconfigured as a control end, and the control end allocates an effective transmission parameter group field to another network device. In this embodiment of this application, the same time period may be the same transmission time interval (TTI), the same slot, or another time length unit. For example, when N=5, and P=1, it indicates that one network device sends all five pieces of transmission control information. For another example, when N=5, and P=5, it indicates that five network devices send five pieces of transmission control information, where each network device sends one piece of transmission control information. For still another example, when N=5, and P=2, it is possible that one network device sends two pieces of transmission control information, and the other network device sends three pieces of transmission control information; or it is possible that one network device sends one piece of transmission control information, and the other network device sends four pieces of transmission control information.

Figure 4:
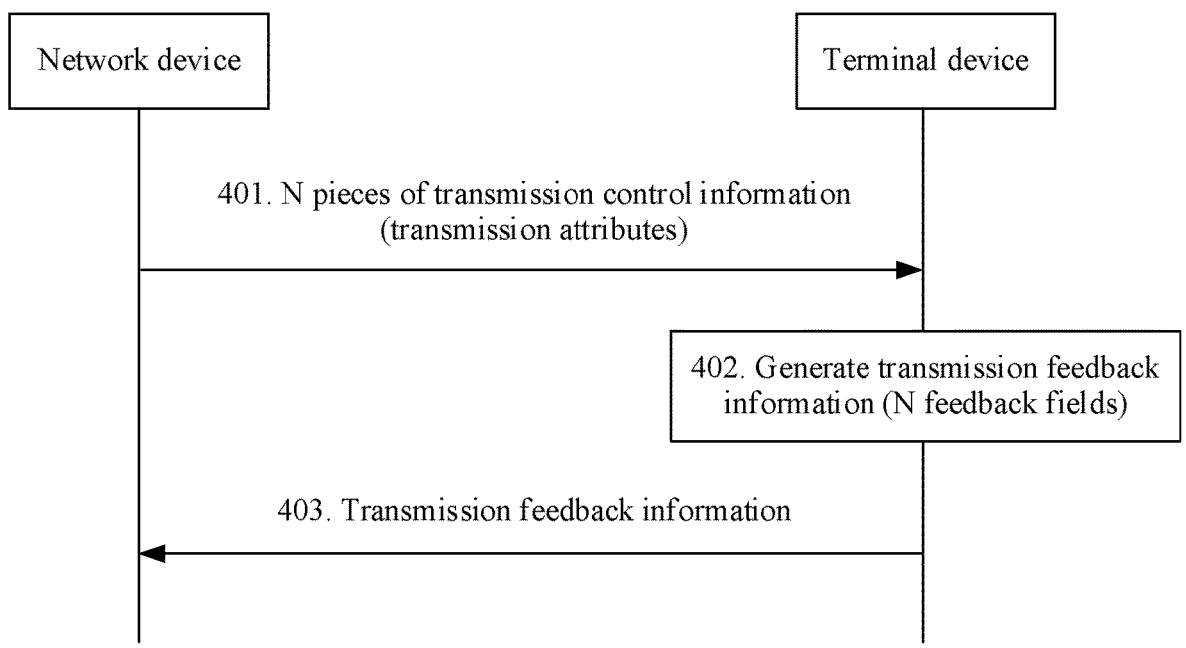
FIG. 4 is a schematic diagram of another embodiment of a transmission control method according to an embodiment of this application.

As shown in FIG. 4, another embodiment of a transmission control method according to an embodiment of this application includes the following steps.

401. A terminal device receives N pieces of transmission control information sent by a network device, where each piece of transmission control information is used to schedule one transport block, a transmission attribute of each of the N pieces of transmission control information is one of a first transmission attribute to an $N^{th}$ transmission attribute in the same type of transmission attributes, and a transmission attribute of any piece of transmission control information is different from transmission attributes of other pieces of transmission control information, where N is an integer greater than 1.

The N pieces of transmission control information received by the terminal device may come from a single network device, or may come from two or more network devices.

The transmission control information may be DCI. For example, if N=2, there are two pieces of transmission control information. If the two pieces of transmission control information are represented by DCI, the two pieces of transmission control information include DCI 1 and DCI 2. A transmission attribute of the DC may be a first transmission attribute, a transmission attribute of the DCI 2 is a second transmission attribute, and the first transmission attribute is different from the second transmission attribute. The transmission attributes herein are transmission attributes of the same type. That transmission attributes are different may mean that attribute values are different, numbers are different, identifiers are different, or ranges are different. For example, the transmission attribute may include a control resource set CORESET, quasi co-location (QCL), a format, or a demodulation reference signal (DMRS) group. The CORESET, the QCL, the format, and the DMRS group are four different types of transmission attributes. Each CORESET has its own identifier, that is, a CORESET ID. Therefore, CORESET IDs of the DCI 1 and the DCI 2 are different. The CORESET IDs may be used to distinguish between the DCI 1 and the DCI 2, and feedbacks are provided specifically to two transport blocks scheduled by using the DCI 1 and the DCI 2.

402. After receiving the N pieces of transmission control information from the network device, the terminal device generates transmission feedback information based on the N pieces of transmission control information, where the transmission feedback information includes N feedback fields: a first feedback field to an $N^{th}$ feedback field, and an $M^{th}$ feedback field is used to provide a feedback specific to a transport block scheduled by using transmission control information that is in the N pieces of transmission control information and whose transmission attribute is a $Q^{th}$ transmission attribute, where M is an integer, $1 \leq M \leq N$, Q is an integer, and $1 \leq Q \leq N$.

It should be noted that the $M^{th}$ feedback field in the N feedback fields in the transmission feedback information may be used to or may not be used to indicate an arrangement sequence number of the feedback field in the N feedback fields. For example, if N=8. M=3, and Q=2, a third feedback field may be used to provide a feedback specific to a transport block scheduled by using transmission control information that is in eight pieces of transmission control information and whose transmission attribute is a second transmission attribute, and the third feedback field may be the seventh feedback field in eight feedback fields arranged sequentially.

For design methods of various arrangement sequences, refer to the design methods of various arrangement sequences in the foregoing embodiment.

403. The terminal device sends the transmission feedback information to the network device.

It can be learned from this embodiment that, transport blocks respectively scheduled by using at least two pieces of transmission control information can be accurately distinguished, and even if HARQ IDs corresponding to the two transport blocks are the same, the transport blocks can still be accurately distinguished based on different transmission attributes of transmission control information in the same type of transmission attributes; and an effective feedback is provided.

Optionally, in the embodiment corresponding to FIG. 4, the N pieces of transmission control information come from P network devices, where $1 \leq P \leq N$. In this embodiment, regardless of whether the N pieces of transmission control information come from a single network device or different network devices, transport blocks transmitted by the network device in the same time period can be accurately distinguished. If P is greater than 1, the P network devices interact with each other, so that transmission attributes of the N pieces of transmission control information are determined; or one of the P network devices is preconfigured as a control end, and the control end allocates a transmission attribute to another network device. In this embodiment of this application, the same time period may be the same TI, the same slot, or another time length unit. For a device for sending the N pieces of transmission control information, refer to related descriptions in the foregoing embodiment.

Figure 5:
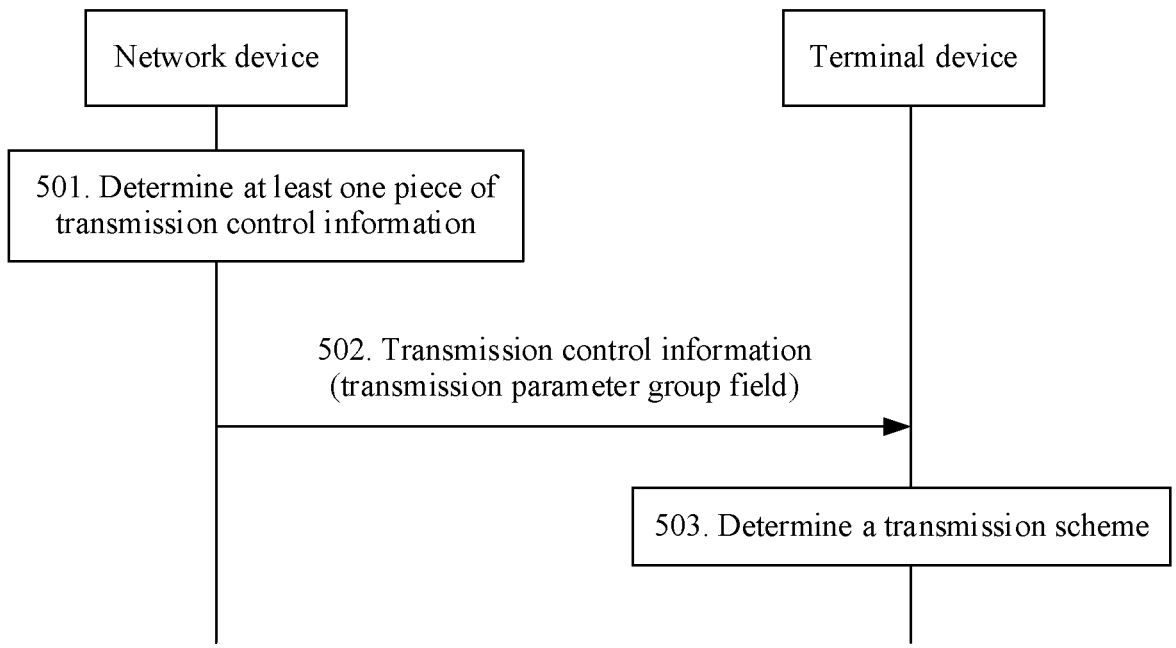
FIG. 5 is a schematic diagram of another embodiment of a transmission control method according to an embodiment of this application.

As shown in FIG. 5, another embodiment of a transmission control method according to an embodiment of this application includes the following steps.

501. A network device generates at least one piece of transmission control information.

502. The network device sends the at least one piece of transmission control information to a terminal device.

The at least one piece of transmission control information is included in N pieces of transmission control information received by the terminal device, where each piece of transmission control information is used to schedule one transport block and includes G transmission parameter group fields: a first transmission parameter group field to a G transmission parameter group field; and only one of the G transmission parameter group fields in each piece of transmission control information is effective, where N is an integer greater than 1, and G is an integer greater than or equal to 1.

Each transmission parameter group field includes, for example, but is not limited to, three types of transmission parameters: a transmission parameter A, a transmission parameter B, and a transmission parameter C.

503. After receiving the N pieces of transmission control information, the terminal device determines a transmission scheme.

The transmission scheme is associated with a combination result of effective transmission parameter group fields of the N pieces of transmission control information. The combination result is, for example, but is not limited to, a combination result obtained by combining effective transmission parameter group fields of the N pieces of transmission control information based on a preset arrangement sequence of the transmission control information. For example, the combination result is a combination result in which effective transmission parameter group fields are the same, or a combination result in which none of effective transmission parameter group fields are the same, or a combination result in which not all effective transmission parameter group fields are the same, that is, a combination result in which some effective transmission parameter group fields are the same and some are different.

The transmission control information may be DCI, and the combination result of the transmission parameter group fields may be that in all pieces of DCI, all effective transmission parameter group fields are identical or different, or some effective transmission parameter group fields are the same and some are different.

A transport block transmission scheme may be determined in this combination manner, thereby facilitating transport block reception.

Optionally, when N=2 and G=2, the determining a transmission scheme, where the transmission scheme is associated with a combination result of effective transmission parameter group fields of the N pieces of transmission control information may include:

if effective transmission parameter group fields in two pieces of transmission control information are the same, a transmission scheme of two transport blocks scheduled by using the two pieces of transmission control information is a transmit diversity transmission scheme; or if effective transmission parameter group fields in two pieces of transmission control information are different, a transmission scheme of two transport blocks scheduled by using the two pieces of transmission control information is a spatial multiplexing transmission scheme.

Certainly, the foregoing provides only a relationship between a combination manner and a transmission scheme, and the relationship may alternatively be:

if effective transmission parameter group fields in two pieces of transmission control information are the same, a transmission scheme of two transport blocks scheduled by using the two pieces of transmission control information is a spatial multiplexing transmission scheme; or if effective transmission parameter group fields in two pieces of transmission control information are different, a transmission scheme of two transport blocks scheduled by using the two pieces of transmission control information is a transmit diversity transmission scheme.

In the transmit diversity scheme, a plurality of channels can be used to carry a plurality of signal copies of the same information. A receiver receives a plurality of signals and combines the plurality of signals according to a specific rule. A transmit diversity mainly reduces a bit error rate and improves transmission reliability. In the spatial division multiplexing scheme, multipath components in spatial propagation can be fully used, and a plurality of channels of different signals can be transmitted on the same time-frequency resource, thereby increasing capacity. The spatial division multiplexing scheme mainly increases the data rate and improves spectral efficiency.

It can be learned from the foregoing that, if both DCI 1 and DCI 2 use a first transmission parameter group field or a second transmission parameter group field, it may be determined that a transport block transmission mode is a transmit diversity mode; and if the DCI 1 uses the first transmission parameter group field, and the DCI 2 uses the second transmission parameter group field, or if the DCI 1 uses the second transmission parameter group field, and the DCI 2 uses the first transmission parameter group field, it may be determined that the transport block transmission mode is a spatial multiplexing mode.

Optionally, the N pieces of transmission control information may come from P network devices, where 1≤P≤N. In this embodiment of this application, regardless of whether the N pieces of transmission control information come from a single network device or different network devices, a transmission scheme can be determined. If P is greater than 1, the P network devices interact with each other to facilitate a coordinated transmission mode; or one of the P network devices is preconfigured as a control end, and the control end determines a transmission mode of the N pieces of transmission control information. For a device for sending the N pieces of transmission control information, refer to related descriptions in the foregoing embodiment.

Based on FIG. 3, FIG. 4, or FIG. 5, and any embodiment, optionally, in the transmission control method embodiment provided in this embodiment of this application, at least one of the N pieces of transmission control information includes a transmission resource indication, the transmission resource indication is used to indicate at least a transmission resource of transmission feedback information, and the transmission feedback information is used to provide a feedback specific to transport blocks scheduled by using the N pieces of transmission control information. The transmission feedback information may include, for example, but is not limited to, an ACK response corresponding to a correctly demodulated transport block, a NACK response corresponding to an incorrectly demodulated transport block, and the like. The transmission resource indication may indicate an uplink resource used during the transmission of the transmission feedback information. It should be noted that the transmission feedback information described in this specification should be understood as having a function of transmitting feedback information such as an ACK or a NACK. Based on this, the transmission feedback information may further have another function.

Optionally, based on the foregoing embodiment, the transmission control method embodiment provided in this embodiment of this application may further include: determining, according to a selection policy, a target transmission resource indication used for the transmission feedback information, where when only one of the N pieces of transmission control information includes a transmission resource indication, the selection policy is an indication policy of selecting the transmission resource indication as the target transmission resource indication; when at least two of the N pieces of transmission control information include transmission resource indications, and the at least two transmission resource indications are the same, the selection policy is an indication policy of selecting the same transmission resource indication as the target transmission resource indication; or when at least two of the N pieces of transmission control information include transmission resource indications, the selection policy is an indication policy of selecting a specified transmission resource indication as the target transmission resource indication. It can be learned from this embodiment that, if only one of the N pieces of DCI carries a transmission resource indication, a transmission resource indicated by the transmission resource indication is used to provide a feedback. If at least two of the N pieces of DCI carry transmission resource indications and the transmission resource indications are the same, a transmission resource indication of any piece of DCI of the at least two pieces of DCI is randomly selected, and a feedback is provided based on a transmission resource indicated by the transmission resource indication. If more than one of the N pieces of DCI carries a transmission resource indication, and at least two of the transmission resource indications are not the same, the target transmission resource indication may be selected according to a rule pre-established by the network device. For example, a transmission resource indication carried in DCI that is in the N pieces of DCI and that has a smallest control resource set (CORESET) identifier (ID) is specified as a target transmission resource to be used, or a transmission resource indication carried in DCI that is in DCI carrying transmission resource indications and that has a smallest CORESET ID is specified as a target transmission resource to be used. In addition, even if two transmission resource indications are the same, the target transmission resource indication may be selected in a specified manner. For example, a transmission resource indication that is first decoded is selected as the target transmission resource indication. A CORESET is a time-frequency resource carrying DCI. Each CORESET has an ID, and a plurality of CORESETs may be configured on a network side. Therefore, there are a plurality of CORESET IDs. There is no same CORESET ID in the same time period. Certainly, a description is provided herein by using the smallest CORESET ID as an example. Actually, the largest CORESET ID may be used, or a specified option determined in another manner may be used. In addition, a CORESET ID is not the only identification manner, namely, using a CORESET ID. For example, a target transmission resource may alternatively be selected by using a quasi co-location (QCL) value range or a demodulation reference signal (DMRS) group identifier.

Optionally, based on the embodiment corresponding to FIG. 3 or FIG. 4 or any embodiment, in the transmission control method embodiment provided in this embodiment of this application, the sending the transmission feedback information to the network device may include: transmitting the transmission feedback information on a transmission resource indicated by the target transmission resource indication, where an arrangement sequence of the N feedback fields in the transmission feedback information is a sequence of transmission attributes of the N pieces of transmission control information. The transmission attribute may include a control resource set CORESET, quasi co-location (QCL), a format, or a demodulation reference signal (DMRS) group. Each type of transmission attribute has a sequence number or a sequence identifier. For example, a CORESET ID sequence may be numbered from 1 and the number is successively incremented by 1: a CORESET 1, a CORESET 2, a CORESET 3, and so on. In this way, if there are two pieces of DCI: DCI 1 and DCI 2, a CORESET ID of the DCI 1 is a CORESET 1, the DCI 1 is used to schedule a TB 1, a CORESET ID of the DCI 2 is a CORESET 2, and the DCI 2 is used to schedule a TB 2, a transmission attribute sequence in this example is the CORESET 1→the CORESET 2. In other words, the CORESET 1 is arranged before the CORESET 2. Two feedback fields in the transmission feedback information are a first feedback field and a second feedback field, the first feedback field is sequentially arranged before the second feedback field, and a sequence of the first feedback field and the second feedback field is corresponding to a sequence of the CORESET 1 and the CORESET 2. Therefore, the first feedback field indicates a feedback specific to the TB 1, and the second feedback field indicates a feedback specific to the TB 2. For example, when a DMRS group sequence is used, the arrangement sequence of the N feedback fields in the transmission feedback information is a sequence of DMRS groups to which demodulation reference signal (DMRS) ports included in the N pieces of transmission control information belong. Each piece of DCI includes a DMRS port, and the DMRS port is grouped into a DMRS group in advance. Therefore, one TB is corresponding to one DMRS group, each DMRS group has a number or an identifier, and all the DMRS groups have different numbers, for example, a DMRS group 1 and a DMRS group 2. Therefore, ACKs/NACKs that are in the transmission feedback fields and that are corresponding to scheduled transport blocks may be arranged based on a number sequence of the DMRS groups. For example, if two transport blocks scheduled by using two pieces of DCI are a TB 1 and a TB 2, a number of a DMRS group corresponding to the TB 1 is 2, and a number of a DMRS group corresponding to the TB 2 is 1, two feedback fields in the transmission feedback information are respectively used to sequentially provide feedbacks specific to the TB 2 and the TB 1. Using four pieces of DCI as an example, four transport blocks scheduled by using the four pieces of DCI are a TB 1, a TB 2, a TB 3, and a TB 4, a number of a DMRS group corresponding to the TB 1 is 3, a number of a DMRS group corresponding to the TB 2 is 4, a number of a DMRS group corresponding to the TB 3 is 1, and a number of a DMRS group corresponding to the TB 4 is 2. If four feedback fields in the transmission feedback information are arranged in ascending order of numbers of the DMRS groups, the four feedback fields in the transmission feedback information are respectively used to sequentially provide feedbacks specific to the TB 3, the TB 4, the TB 1, and the TB 2. If two pieces of DCI are used to schedule two transport blocks, the first bit in 2 bits may be used to provide a feedback specific to one transport block, and the second bit in the 2 bits may be used to provide a feedback specific to the other transport block. A sequence of the two transport blocks that is indicated by the two bits may alternatively be determined in ascending order of numbers of DMRS groups. Certainly, the sequence is not limited to the ascending arrangement sequence, and may alternatively be a descending arrangement sequence. The arrangement sequence may be pre-negotiated between the network device and the terminal device or pre-specified in a standard. A principle for sorting other CORESET IDs, QCL, or formats is basically the same as that of the foregoing DMRS groups. The CORESET ID may be a specific number value, the QCL may be a range or a specific value, and the format may be Format A, Format B, or the like. In addition, it is not limited that one bit is used to indicate a feedback specific to one transport block. For example, if two pieces of DCI are used to schedule two transport blocks (a TB 1 and a TB 2), three bits may be used to indicate eight states. For example, 000 indicates that the TB 1 is received and correctly demodulated and the TB 2 is received and correctly demodulated; 001 indicates that the TB 1 is received and correctly demodulated and the TB 2 is received but incorrectly demodulated; 010 indicates that the TB 1 is received but incorrectly demodulated and the TB 2 is received and correctly demodulated; 011 indicates that the TB 1 is received but incorrectly demodulated and the TB 2 is received but incorrectly demodulated; 100 indicates that the TB 1 is received and correctly demodulated and the TB 2 is not received; 101 indicates that the TB 1 is received but incorrectly demodulated and the TB 2 is not received; 110 indicates that the TB 1 is not received and the TB 2 is received and correctly demodulated; and 111 indicates that the TB 1 is not received and the TB 2 is received but incorrectly demodulated. A feedback sequence of the feedback fields is determined based on a sequence corresponding to each of the DMRS group, the CORESET ID, the QCL, the format, or other attributes, to implement orderly feedback specific to a plurality of transport blocks without adding other fields or information for indication.

That two pieces of control information are used to schedule two transport blocks is used as an example to describe the determination of a correspondence between a feedback field and a transport block by using a DMRS group. Table 3 is a correspondence table about a 2-bit ACK/NACK feedback. Table 4 is a correspondence table about a 3-bit ACK/NACK feedback.

TABLE 3

Correspondence table about a 2-bit ACK/NACK feedback

| ACK/NACK | Meaning |
|---|---|
| 11 | A transport block 1 is corresponding to an ACK, and a transport block 2 is corresponding to an ACK |
| 10 | The transport block 1 is corresponding to an ACK, and the transport block 2 is corresponding to a NACK or DTX |
| 01 | The transport block 1 is corresponding to a NACK or DTX, and the transport block 2 is corresponding to an ACK |
| 00 | The transport block 1 is corresponding to a NACK or DTX, and the transport block 2 is corresponding to a NACK or DTX |

A DMRS group 1 is correspondingly used to schedule the transport block 1, and a DMRS group 2 is correspondingly used to schedule the transport block 2. DTX indicates that the terminal device does not find the control information.

TABLE 4

Correspondence table about a 3-bit ACK/NACK feedback

| ACK/NACK | Meaning |
|---|---|
| 111 | A transport block 1 is corresponding to an ACK, and a transport block 2 is corresponding to an ACK |
| 110 | The transport block 1 is corresponding to an ACK, and the transport block 2 is corresponding to a NACK |
| 101 | The transport block 1 is corresponding to a NACK, and the transport block 2 is corresponding to an ACK |
| 100 | The transport block 1 is corresponding to a NACK, and the transport block 2 is corresponding to a NACK |
| 011 | The transport block 1 is corresponding to an ACK, and the transport block 2 is corresponding to DTX |
| 010 | The transport block 1 is corresponding to DTX, and the transport block 2 is corresponding to an ACK |
| 001 | The transport block 1 is corresponding to a NACK, and the transport block 2 is corresponding to DTX |
| 000 | The transport block 1 is corresponding to DTX, and the transport block 2 is corresponding to a NACK |

A DMRS group 1 is correspondingly used to schedule the transport block 1, and a DMRS group 2 is correspondingly used to schedule the transport block 2. DTX indicates that the terminal device does not find the control information.

Based on the embodiment corresponding to FIG. 5 or the optional embodiment, the transmission feedback information may alternatively be transmitted on the transmission resource indicated by the target transmission resource indication, where an arrangement sequence of X feedback fields in the transmission feedback information is an arrangement sequence of effective transmission parameter groups in the N pieces of transmission control information, and X is an integer less than or equal to N. When effective transmission parameter group fields in Y pieces of the N pieces of transmission control information are the same, feedbacks specific to transport blocks scheduled by using the Y pieces of transmission control information are all the same, and only one feedback field is to be used to provide a feedback. When N=8 and Y=3, if the remaining five effective transmission parameter group fields are all different, and are also different from the three transmission parameter group fields, only six feedback fields are required to complete feedback. In this case, X=6. Certainly, even if effective transmission parameter group fields of a plurality of pieces of transmission control information are the same, N feedback fields can still be used to provide a feedback. For example, when N=8 and Y=3, eight feedback fields can still be used to provide a feedback, one feedback field is still used specific to each of the three same effective transmission parameter group fields, but feedback content of the feedback fields is the same.

The foregoing different embodiments may be independent of each other, or may be combined with each other. In addition, a description of the same feature in one embodiment may be applicable to another embodiment, or may be inapplicable to another embodiment.

A plurality of transmission control schemes are described in the foregoing plurality of transmission control method embodiments. The following describes the terminal device, the network device, and the system on chip in the embodiments of this application with reference to the accompanying drawings.

Figure 6:
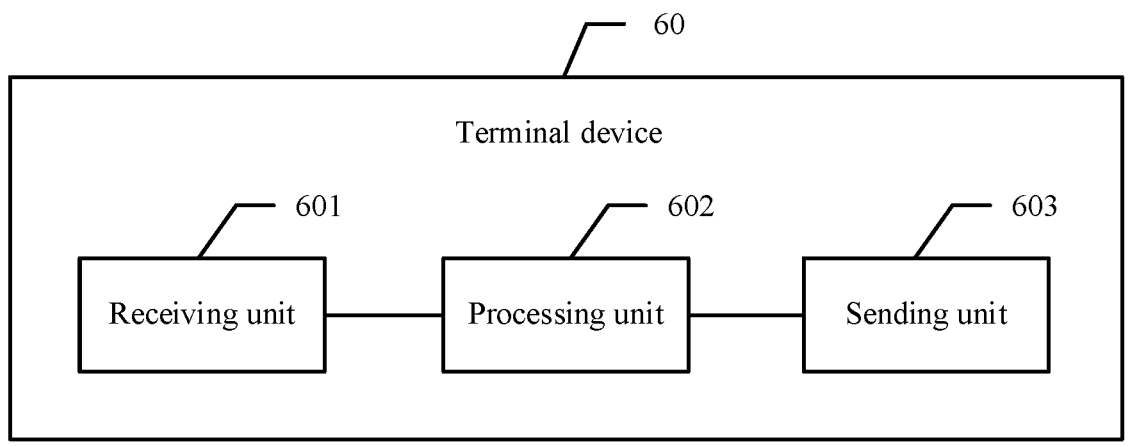
FIG. 6 is a schematic diagram of an embodiment of a terminal device according to an embodiment of this application.

As shown in FIG. 6, an embodiment of a terminal device 60 provided in an embodiment of this application includes:

a receiving unit 601, configured to receive N pieces of transmission control information, where each piece of transmission control information is used to schedule one transport block and includes F transmission parameter group fields: a first transmission parameter group field to an $F^{th}$ transmission parameter group field, only one of the F transmission parameter group fields in each piece of transmission control information is effective, and an effective transmission parameter group field in each of the N pieces of transmission control information is different from effective transmission parameter group fields in other pieces of transmission control information, where N is an integer greater than 1, and F is an integer greater than or equal to N; and a processing unit 602, configured to generate, based on the N pieces of transmission control information received by the receiving unit 601, transmission feedback information corresponding to transport blocks respectively scheduled by using the N pieces of transmission control information, where the transmission feedback information includes N feedback fields: a first feedback field to an $N^{th}$ feedback field, and an $M^{th}$ feedback field is used to provide a feedback specific to a transport block scheduled by using transmission control information that is in the N pieces of transmission control information and whose transmission attribute is a $Q^{th}$ transmission attribute, where M is an integer, 1≤M≤N, Q is an integer, and 1≤Q≤N.

Still referring to FIG. 6, another embodiment of the terminal device 60 provided in this embodiment of this application includes:

a receiving unit 601, configured to receive N pieces of transmission control information, where each piece of transmission control information is used to schedule one transport block, a transmission attribute of each of the N pieces of transmission control information is one of a first transmission attribute to an $N^{th}$ transmission attribute in the same type of transmission attributes, and a transmission attribute of any piece of transmission control information is different from transmission attributes of other pieces of transmission control information, where N is an integer greater than 1; and a processing unit 602, configured to generate, based on the N pieces of transmission control information received by the receiving unit 601, transmission feedback information corresponding to transport blocks respectively scheduled by using the N pieces of transmission control information, where the transmission feedback information includes N feedback fields: a first feedback field to an $N^{th}$ feedback field, and an $M^{th}$ feedback field is used to provide a feedback specific to a transport block scheduled by using transmission control information that is in the N pieces of transmission control information and whose transmission attribute is a $Q^{th}$ transmission attribute, where M is an integer, $1 \leq M \leq N$, Q is an integer, and $1 \leq Q \leq N$.

Still referring to FIG. 6, another embodiment of the terminal device 60 provided in this embodiment of this application includes:

a receiving unit 601, configured to receive N pieces of transmission control information, where each piece of transmission control information is used to schedule one transport block and includes G transmission parameter group fields: a first transmission parameter group field to a $G^{th}$ transmission parameter group field, and only one of the G transmission parameter group fields in each piece of transmission control information is effective, where N is an integer greater than 1, and G is an integer greater than or equal to 1; and a processing unit 602, configured to determine a transmission scheme, where the transmission scheme is associated with a combination result of effective transmission parameter group fields in the N pieces of transmission control information received by the receiving unit 601.

Optionally, the processing unit 602 is specifically configured to: when N=2 and G=2, if effective transmission parameter group fields in two pieces of transmission control information are the same, determine that a transmission scheme of two transport blocks scheduled by using the two pieces of transmission control information is a transmit diversity transmission scheme or a spatial multiplexing transmission scheme; or if effective transmission parameter group fields in two pieces of transmission control information are different, determine that a transmission scheme of two transport blocks scheduled by using the two pieces of transmission control information is a spatial multiplexing transmission scheme or a transmit diversity transmission scheme.

Optionally, at least one of the N pieces of transmission control information includes a transmission resource indication, and the transmission resource indication is used to indicate at least a transmission resource of transmission feedback information.

Optionally, the processing unit 602 is further configured to determine, according to a selection policy, a target transmission resource indication used for the transmission feedback information, where when only one of the N pieces of transmission control information includes a transmission resource indication, the selection policy is an indication policy of selecting the transmission resource indication as the target transmission resource indication;

when at least two of the N pieces of transmission control information include transmission resource indications, and the at least two transmission resource indications are the same, the selection policy is an indication policy of selecting the same transmission resource indication as the target transmission resource indication; or when at least two of the N pieces of transmission control information include transmission resource indications, the selection policy is an indication policy of selecting a specified transmission resource indication as the target transmission resource indication.

Optionally, the terminal device further includes:

a sending unit 603, configured to transmit the transmission feedback information on a transmission resource indicated by the target transmission resource indication, where an arrangement sequence of the N feedback fields in the transmission feedback information is a sequence of transmission attributes of the N pieces of transmission control information.

Figure 7:
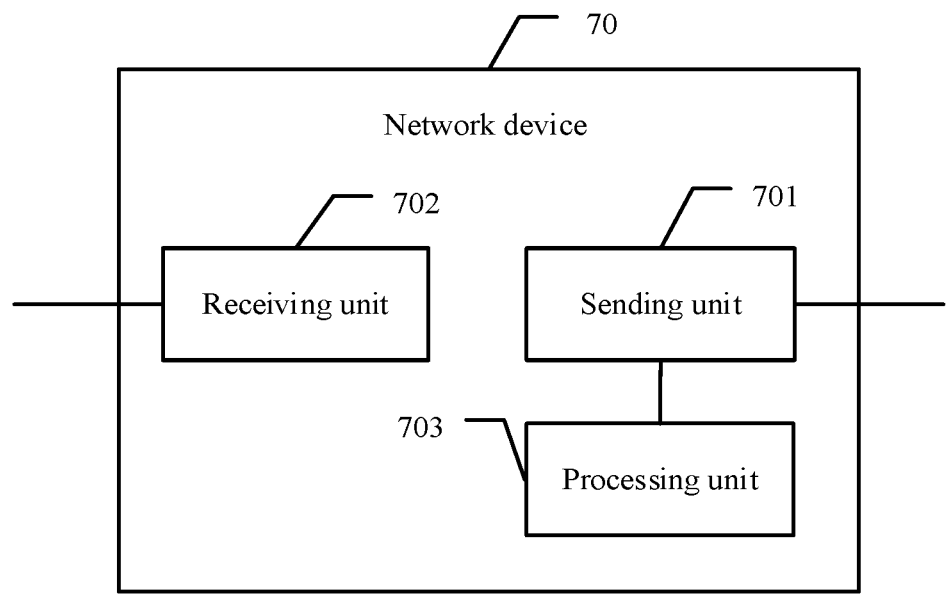
FIG. 7 is a schematic diagram of an embodiment of a network device according to an embodiment of this application.

As shown in FIG. 7, an embodiment of a network device 70 provided in an embodiment of this application includes:

a sending unit 701, configured to send at least one piece of transmission control information, where the at least one piece of transmission control information is included in N pieces of transmission control information received by a terminal device, each piece of transmission control information is used to schedule one transport block and includes F transmission parameter group fields: a first transmission parameter group field to an $F^{th}$ transmission parameter group field, only one of the F transmission parameter group fields in each piece of transmission control information is effective, and an effective transmission parameter group field in each of the N pieces of transmission control information is different from effective transmission parameter group fields in other pieces of transmission control information, where N is an integer greater than 1, and F is an integer greater than or equal to N; and a receiving unit 702, configured to receive transmission feedback information corresponding to the N pieces of transmission control information, where the transmission feedback information includes N feedback fields: a first feedback field to an $N^{th}$ feedback field, and an $M^{th}$ feedback field is used to provide a feedback specific to a transport block scheduled by using transmission control information that is in the N pieces of transmission control information and whose transmission attribute is a $Q^{th}$ transmission attribute, where M is an integer, $1 \leq M \leq N$, Q is an integer, and $1 \leq Q \leq N$.

Still referring to FIG. 7, another embodiment of the network device 70 provided in this embodiment of this application includes:

a sending unit 701, configured to send at least one piece of transmission control information, where the at least one piece of transmission control information is included in N pieces of transmission control information received by a terminal device, each piece of transmission control information is used to schedule one transport block, a transmission attribute of each of the N pieces of transmission control information is one of a first transmission attribute to an $N^{th}$ transmission attribute in the same type of transmission attributes, and a transmission attribute of any piece of transmission control information is different from transmission attributes of other pieces of transmission control information, where N is an integer greater than 1; and a receiving unit 702, configured to receive transmission feedback information corresponding to transport blocks respectively scheduled by using the N pieces of transmission control information, where the transmission feedback information includes N feedback fields: a first feedback field to an $N^{th}$ feedback field, and an $M^{th}$ feedback field is used to provide a feedback specific to a transport block scheduled by using transmission control information that is in the N pieces of transmission control information and whose transmission attribute is a Q transmission attribute, where M is an integer, $1 \leq M \leq N$, and $1 \leq Q \leq N$.

Still referring to FIG. 7, another embodiment of the network device 70 provided in this embodiment of this application includes:

a processing unit 703, configured to generate at least one piece of transmission control information; and a sending unit 701, configured to send the at least one piece of transmission control information determined by the processing unit 703, where the at least one piece of transmission control information is included in N pieces of transmission control information received by a terminal device, the N pieces of transmission control information are used by the terminal device to determine a transmission scheme, and the transmission scheme is associated with a combination result of effective transmission parameter group fields in the N pieces of transmission control information; each piece of transmission control information is used to schedule one transport block and includes G transmission parameter group fields: a first transmission parameter group field to a $G^{th}$ transmission parameter group field; and only one of the G transmission parameter group fields in each piece of transmission control information is effective, where N is an integer greater than 1, and G is an integer greater than or equal to 1.

In the terminal device 60, the processing unit 602 may be the processor 101 in the terminal device shown in FIG. 2, and the receiving unit 601 and the sending unit 603 may be the transceiver 103 in FIG. 2. In the network device 70, the sending unit 701 and the receiving unit 702 may be the transceiver 203 in FIG. 2, and the processing unit 703 may be the processor 201 in the network device shown in FIG. 2. For a function of the terminal device 60, refer to the steps performed by the terminal device in the embodiments in FIG. 3 to FIG. 5 or the optional embodiments. For a function of the network device 70, refer to the steps performed by the network device in the embodiments in FIG. 3 to FIG. 5 or the optional embodiments.

Figure 8:
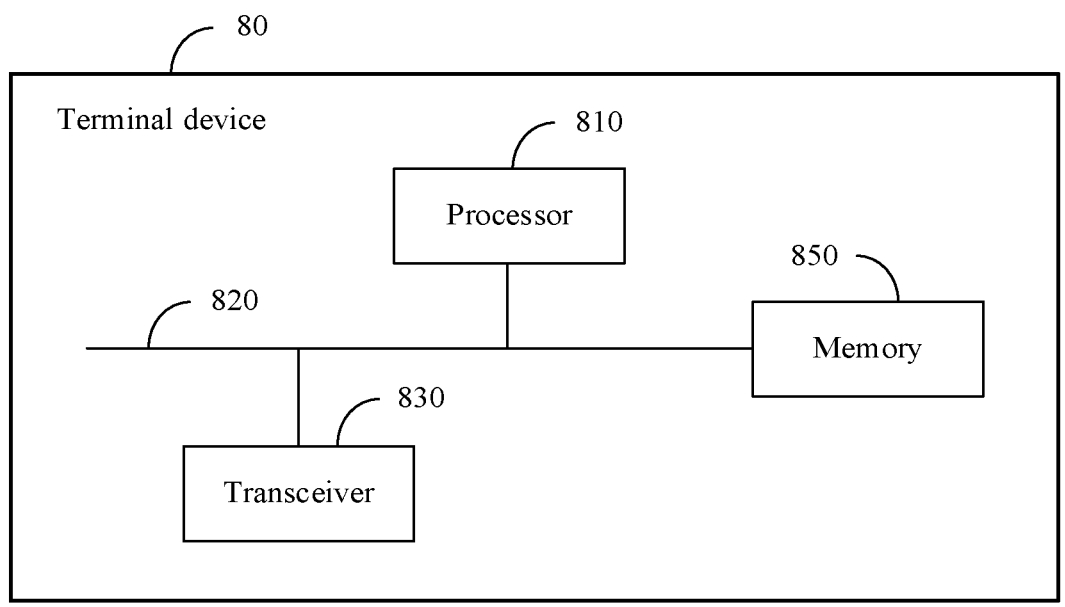
FIG. 8 is a schematic diagram of another embodiment of a terminal device according to an embodiment of this application.

To facilitate understanding of functions of components of the terminal device and the network device that are shown in FIG. 2 in a data transmission process of this application, the following uses the terminal device as an example for description with reference to FIG. 8.

FIG. 8 is a schematic structural diagram of a terminal device 80 according to an embodiment of this application. The terminal device 80 includes at least one processor 810, a memory 850, and a transceiver 830. The transceiver may include a receiver and a transmitter. The memory 850 may include a read-only memory and/or a random access memory, and provide an operation instruction and data for the processor 810. A part of the memory 850 may further include a nonvolatile random access memory (NVRAM).

In some implementations, the memory 850 stores the following elements: an executable module or a data structure, a subset thereof, or an extended set thereof.

In this embodiment of this application, a corresponding operation is performed by invoking the operation instruction (the operation instruction may be stored in an operating system) stored in the memory 850. The processor 810 controls an operation of the terminal device 80. The processor 810 may also be referred to as a central processing unit (CPU). The memory 850 may include a read-only memory and a random access memory, and provide an instruction and data to the processor 810. Apart of the memory 850 may further include anon-volatile random access memory (NVRAM). In specific application, components of the terminal device 80 are coupled together by a using bus system 820. In addition to a data bus, the bus system 820 may further include a power bus, a control bus, a status signal bus, and the like. However, for clear description, various buses in the figure are marked as the bus system 820.

The methods disclosed in the foregoing embodiments of this application may be applied to the processor 810 or may be implemented by the processor 810. The processor 810 may be an integrated circuit chip and has a signal processing capability. In an implementation process, the steps in the foregoing methods can be implemented by using a hardware integrated logic circuit in the processor 810 or by using instructions in a form of software. The processor 810 may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The processor 810 may implement or perform the methods, steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory 850. The memory 850 may be a physically independent unit, or may be integrated with the processor 810. The processor 810 reads information in the memory 850, and completes the steps of the foregoing methods in combination with hardware of the processor 810. The memory may be a non-transitory memory.

Optionally, the transceiver 830 is configured to perform a message sending step performed by the terminal device in the embodiments shown in FIG. 3 to FIG. 5 or in another optional embodiment.

The processor 810 is configured to perform a data processing step performed by the terminal device in the embodiments shown in FIG. 3 to FIG. 5 or in another optional embodiment.

A structure of a network device may also be understood with reference to FIG. 8. A corresponding transceiver and processor in the network device may perform a corresponding receiving or processing step respectively performed by the network device in the embodiments shown in FIG. 3 to FIG. 5 or in another optional embodiment.

Figure 9:
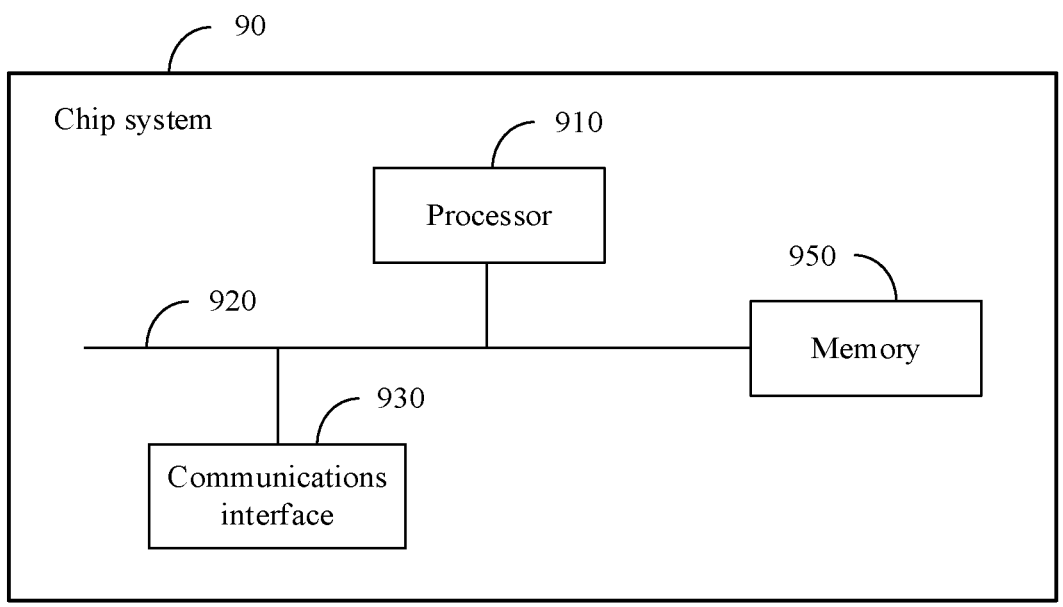
FIG. 9 is a schematic diagram of an embodiment of a system on chip according to an embodiment of this application.

FIG. 9 is a schematic structural diagram of another implementation of a chip system 90 according to an embodiment of this application. The chip system 90 includes at least one processor 910, a memory 950, and a communications interface 930. The memory 950 may include a read-only memory and a random access memory, and provide an operation instruction and data for the processor 910. A part of the memory 950 may further include a non-volatile random access memory (NVRAM).

In some implementation manners, the memory 950 stores the following elements, an executable module or a data structure, or a subset thereof, or an extended set thereof.

In this embodiment of this application, a corresponding operation is performed by invoking the operation instruction (where the operation instruction may be stored in an operating system) stored in the memory 950.

In a possible implementation, structures of the chip system and a chip system used by a network device are similar, but different apparatuses use different chip systems to implement respective functions.

The processor 910 controls an operation of the chip system. The processor 910 may also be referred to as a central processing unit (CPU). The memory 950 may include a read-only memory and a random access memory, and provide instruction and data to the processor 910. A part of the memory 950 may further include a nonvolatile random access memory (NVRAM). In a specific application, components of the chip system 110 are coupled together by using a bus system 920. In addition to a data bus, the bus system 920 may further include a power bus, a control bus, a status signal bus, and the like. However, for a clear description, various buses in the figure are marked as the bus system 920.

The methods disclosed in the embodiments of this application may be applied to the processor 910, or may be implemented by the processor 910. The processor 910 may be an integrated circuit chip and has a signal processing capability. In an implementation process, the steps in the foregoing methods can be implemented by using a hardware integrated logic circuit in the processor 910 or by using instructions in a form of software. The processor 910 may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The processor 910 may implement or perform the methods, steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory 950. The memory 950 may be a physically independent unit, or may be integrated with the processor 910. The processor 910 reads information in the memory 950, and completes the steps of the foregoing methods in combination with hardware of the processor 910. The memory may be a non-transitory memory.

Optionally, the communications interface 930 is configured to perform data receiving and sending steps performed by the terminal device or the network device in the embodiments shown in FIG. 3 to FIG. 5 or in another optional embodiment.

The processor 910 is configured to perform a signal data processing step performed by the terminal device or the network device in the embodiments shown in FIG. 3 to FIG. 5 or in another optional embodiment.

All or some of the foregoing embodiments may be implemented by using software, hardware, firmware, or any combination thereof. When software is used to implement the embodiments, all or some of the embodiments may be implemented in the form of computer program product.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD), or the like.

A person of ordinary skill in the art may understand that all or some of the steps of the methods in the embodiments may be implemented by a program instructing relevant hardware. The program may be stored in a computer-readable storage medium. The storage medium may include a ROM, a RAM, a magnetic disk, an optical disc, or the like.

The data transmission method, device, computer-readable storage medium, and chip system provided in the embodiments of this application are described in detail above. The principle and implementation of the present subject matter are described herein by using specific examples. The descriptions about the foregoing embodiments are merely provided to help understand the method and core ideas of this application. In addition, a person of ordinary skill in the art can make variations to the specific implementations and application scopes according to the ideas of this application. In summary, the content of this specification shall not be construed as any limitation to this application.

What is claimed is:

1. A transmission control method, comprising:
receiving N pieces of transmission control information, wherein each piece of transmission control information is for scheduling one transport block, a transmission attribute of each of the N pieces of transmission control information is one of a first transmission attribute to an $N^{th}$ transmission attribute in a same type of transmission attributes, and a transmission attribute of any piece of transmission control information is different from transmission attributes of other pieces of transmission control information, wherein N is an integer greater than 1; and
generating, based on the N pieces of transmission control information, transmission feedback information corresponding to transport blocks respectively scheduled by using the N pieces of transmission control information, wherein the transmission feedback information comprises N feedback fields: a first feedback field to an $N^{th}$ feedback field, and an $M^{th}$ feedback provides a feedback specific to a transport block scheduled by using transmission control information that is in the N pieces of transmission control information and whose transmission attribute is a $Q^{th}$ transmission attribute, wherein M is an integer, $1 \leq M \leq N$, Q is an integer, and $1 \leq Q \leq N$.

2. The method according to claim 1, wherein at least one of the N pieces of transmission control information comprises a transmission resource indication, and the transmission resource indication indicates at least a transmission resource of transmission feedback information.

3. The method according to claim 2, further comprising:
determining, according to a selection policy, a target transmission resource indication for the transmission feedback information, wherein when only one of the N pieces of transmission control information comprises a transmission resource indication, the selection policy is an indication policy of selecting the transmission resource indication as the target transmission resource indication;

when at least two of the N pieces of transmission control information comprise transmission resource indications, and the at least two transmission resource indications are the same, the selection policy is an indication policy of selecting the same transmission resource indication as the target transmission resource indication; or when at least two of the N pieces of transmission control information comprise transmission resource indications, the selection policy is an indication policy of selecting a specified transmission resource indication as the target transmission resource indication.

4. The method according to claim 3, further comprising: transmitting the transmission feedback information on a transmission resource indicated by the target transmission resource indication, wherein an arrangement sequence of the N feedback fields in the transmission feedback information is a sequence of transmission attributes of the N pieces of transmission control information.

5. The method according to claim 1, wherein the transmission attribute comprises a control resource set (CORESET).

6. The method according to claim 1, wherein the transmission control information comprises downlink control information (DCI).

7. A communication apparatus, comprising:
at least one processor;
at least one memory configured to store a computer program that, when executed by the at least one processor, causes the communication apparatus to perform at least following operations:
receiving N pieces of transmission control information, wherein each piece of transmission control information is for scheduling one transport block, a transmission attribute of each of the N pieces of transmission control information is one of a first transmission attribute to an $N^{th}$ transmission attribute in a same type of transmission attributes, and a transmission attribute of any piece of transmission control information is different from transmission attributes of other pieces of transmission control information, wherein N is an integer greater than 1; and
generating, based on the N pieces of transmission control information, transmission feedback information corresponding to transport blocks respectively scheduled by using the N pieces of transmission control information, wherein the transmission feedback information comprises N feedback fields: a first feedback field to an $N^{th}$ feedback field, and an $M^{th}$ feedback field provides a feedback specific to a transport block scheduled by using transmission control information that is in the N pieces of transmission control information and whose transmission attribute is a $Q^{th}$ transmission attribute, wherein M is an integer, 1≤M≤N, Q is an integer, and 1≤Q≤N.

8. The communication apparatus according to claim 7, wherein at least one of the N pieces of transmission control information comprises a transmission resource indication, and the transmission resource indication indicates at least a transmission resource of transmission feedback information.

9. The communication apparatus according to claim 8, wherein the computer program that, when executed by the at least one processor, causes the communication apparatus to perform at least following operations:
determining, according to a selection policy, a target transmission resource indication for the transmission feedback information, wherein
when only one of the N pieces of transmission control information comprises a transmission resource indication, the selection policy is an indication policy of selecting the transmission resource indication as the target transmission resource indication;

when at least two of the N pieces of transmission control information comprise transmission resource indications, and the at least two transmission resource indications are the same, the selection policy is an indication policy of selecting the same transmission resource indication as the target transmission resource indication; or when at least two of the N pieces of transmission control information comprise transmission resource indications, the selection policy is an indication policy of selecting a specified transmission resource indication as the target transmission resource indication.

10. The communication apparatus according to claim 9, further comprising:
transmitting the transmission feedback information on a transmission resource indicated by the target transmission resource indication, wherein an arrangement sequence of the N feedback fields in the transmission feedback information is a sequence of transmission attributes of the N pieces of transmission control information.

11. The communication apparatus according to claim 7, wherein the transmission attribute comprises a control resource set (CORESET).

12. The communication apparatus according to claim 7, wherein the transmission control information comprises downlink control information (DCI).

13. A non-transitory computer-readable storage medium storing computer instructions, that when executed by at least one processor, cause the at least one processor to perform operations comprising:
receiving N pieces of transmission control information, wherein each piece of transmission control information is for scheduling one transport block, a transmission attribute of each of the N pieces of transmission control information is one of a first transmission attribute to an $N^{th}$ transmission attribute in a same type of transmission attributes, and a transmission attribute of any piece of transmission control information is different from transmission attributes of other pieces of transmission control information, wherein N is an integer greater than 1; and
generating, based on the N pieces of transmission control information, transmission feedback information corresponding to transport blocks respectively scheduled by using the N pieces of transmission control information, wherein the transmission feedback information comprises N feedback fields: a first feedback field to an $N^{th}$ feedback field, and an $M^{th}$ feedback field provides a feedback specific to a transport block scheduled by using transmission control information that is in the N pieces of transmission control information and whose transmission attribute is a $Q^{th}$ transmission attribute, wherein M is an integer, 1≤M≤N, Q is an integer, and 1≤Q≤N.

14. The non-transitory computer-readable storage medium according to claim 13, wherein at least one of the N pieces of transmission control information comprises a transmission resource indication, and the transmission resource indication indicates at least a transmission resource of transmission feedback information.

15. The non-transitory computer-readable storage medium according to claim 14, further comprising:
determining, according to a selection policy, a target transmission resource indication for the transmission feedback information, wherein
when only one of the N pieces of transmission control information comprises a transmission resource indication, the selection policy is an indication policy of selecting the transmission resource indication as the target transmission resource indication;
when at least two of the N pieces of transmission control information comprise transmission resource indications, and the at least two transmission resource indications are the same, the selection policy is an indication policy of selecting the same transmission resource indication as the target transmission resource indication; or
when at least two of the N pieces of transmission control information comprise transmission resource indications, the selection policy is an indication policy of selecting a specified transmission resource indication as the target transmission resource indication.

16. The non-transitory computer-readable storage medium according to claim 15, further comprising:
transmitting the transmission feedback information on a transmission resource indicated by the target transmission resource indication, wherein an arrangement sequence of the N feedback fields in the transmission feedback information is a sequence of transmission attributes of the N pieces of transmission control information.

17. The non-transitory computer-readable storage medium according to claim 13, wherein the transmission attribute comprises a control resource set (CORESET).

18. The non-transitory computer-readable storage medium according to claim 13, wherein the transmission control information comprises downlink control information (DCI).

19. A communications chip comprising at least one processor, wherein the at least one processor is coupled with at least one memory that stores computer instructions, that when executed by the at least one processor, cause the at least one processor to perform operations comprising:
receiving N pieces of transmission control information, wherein each piece of transmission control information is for scheduling one transport block, a transmission attribute of each of the N pieces of transmission control information is one of a first transmission attribute to an $N^{th}$ transmission attribute in a same type of transmission attributes, and a transmission attribute of any piece of transmission control information is different from transmission attributes of other pieces of transmission control information, wherein N is an integer greater than 1; and
generating, based on the N pieces of transmission control information, transmission feedback information corresponding to transport blocks respectively scheduled by using the N pieces of transmission control information, wherein the transmission feedback information comprises N feedback fields: a first feedback field to an $N^{th}$ field, and an $M^{th}$ feedback field provides a feedback specific to a transport block scheduled by using transmission control information that is in the N pieces of transmission control information and whose transmission attribute is a $Q^{th}$ transmission attribute, wherein M is an integer, $1 \leq M \leq N$, Q is an integer, and $1 \leq Q \leq N$.

20. The communications chip according to claim 19, wherein at least one of the N pieces of transmission control information comprises a transmission resource indication, and the transmission resource indication indicates at least a transmission resource of transmission feedback information.

21. The communications chip according to claim 20, further comprising:
determining, according to a selection policy, a target transmission resource indication for the transmission feedback information, wherein
when only one of the N pieces of transmission control information comprises a transmission resource indication, the selection policy is an indication policy of selecting the transmission resource indication as the target transmission resource indication;
when at least two of the N pieces of transmission control information comprise transmission resource indications, and the at least two transmission resource indications are the same, the selection policy is an indication policy of selecting the same transmission resource indication as the target transmission resource indication; or
when at least two of the N pieces of transmission control information comprise transmission resource indications, the selection policy is an indication policy of selecting a specified transmission resource indication as the target transmission resource indication.

22. The communications chip according to claim 21, further comprising:
transmitting the transmission feedback information on a transmission resource indicated by the target transmission resource indication, wherein an arrangement sequence of the N feedback fields in the transmission feedback information is a sequence of transmission attributes of the N pieces of transmission control information.

23. The communications chip according to claim 19, wherein the ansmission attribute comprises a control resource set (CORESET).

24. The communications chip according to claim 19, wherein the transmission control information comprises downlink control information (DCI).

25. A transmission control method, comprising:
sending N pieces of transmission control information, wherein each piece of transmission control information is for scheduling one transport block, a transmission attribute of each of the N pieces of transmission control information is one of a first transmission attribute to an $N^{th}$ transmission attribute in a same type of transmission attributes, and a transmission attribute of any piece of transmission control information is different from transmission attributes of other pieces of transmission control information, wherein N is an integer greater than 1; and
receiving transmission feedback information corresponding to transport blocks respectively scheduled by using the N pieces of transmission control information, wherein the transmission feedback information comprises N feedback fields: a first feedback field to an $N^{th}$ feedback field, and an $M^{th}$ feedback field provides a feedback specific to a transport block scheduled by using transmission control information that is in the N pieces of transmission control information and whose transmission attribute is a $Q^{th}$ transmission attribute, wherein M is an integer, $1 \leq M \leq N$, Q is an integer, and $1 \leq Q \leq N$.

26. The method according to claim 25, wherein at least one of the N pieces of transmission control information comprises a transmission resource indication, and the transmission resource indication indicates at least a transmission resource of transmission feedback information.

27. The method according to claim 25, wherein the transmission attribute comprises a control resource set (CORESET).

28. The method according to claim 25, wherein an arrangement sequence of the N feedback fields in the transmission feedback information is a sequence of transmission attributes of the N pieces of transmission control information.

29. A communication apparatus, comprising:
at least one processor;
at least one memory configured to store a computer program that, when executed by the at least one processor, causes the communication apparatus to perform at least following operations:
generating N pieces of transmission control information, wherein each piece of transmission control information is for scheduling one transport block, a transmission attribute of each of the N pieces of transmission control information is one of a first transmission attribute to an $N^{th}$ transmission attribute in a same type of transmission attributes, and a transmission attribute of any piece of transmission control information is different from transmission attributes of other pieces of transmission control information, wherein N is an integer greater than 1;
sending the N pieces of transmission control information; and
receiving transmission feedback information corresponding to transport blocks respectively scheduled by using the N pieces of transmission control information, wherein the transmission feedback information comprises N feedback fields: a first feedback field to an $N^{th}$ feedback field, and an $M^{th}$ feedback field provides a feedback specific to a transport block scheduled by using transmission control information that is in the N pieces of transmission control information and whose transmission attribute is a $Q^{th}$ transmission attribute, wherein M is an integer, $1 \leq M \leq N$, Q is an integer, and $1 \leq Q \leq N$.

30. The communication apparatus according to claim 29, wherein at least one of the N pieces of transmission control information comprises a transmission resource indication, and the transmission resource indication indicates at least a transmission resource of transmission feedback information.

31. The communication apparatus according to claim 29, wherein the transmission attribute comprises a control resource set (CORESET).

32. The communication apparatus according to claim 29, wherein an arrangement sequence of the N feedback fields in the transmission feedback information is a sequence of transmission attributes of the N pieces of transmission control information.

33. A non-transitory computer-readable storage medium storing computer instructions, that when executed by at least one processor, cause the at least one processor to perform operations comprising:
sending N pieces of transmission control information, wherein each piece of transmission control information is for scheduling one transport block, a transmission attribute of each of the N pieces of transmission control information is one of a first transmission attribute to an $N^{th}$ transmission attribute in a same type of transmission attributes, and a transmission attribute of any piece of transmission control information is different from transmission attributes of other pieces of transmission control information, wherein N is an integer greater than 1; and
receiving transmission feedback information corresponding to transport blocks respectively scheduled by using the N pieces of transmission control information, wherein the transmission feedback information comprises N feedback fields: a first feedback field to an $N^{th}$ feedback field, and an $M^{th}$ feedback field provides a feedback specific to a transport block scheduled by using transmission control information that is in the N pieces of transmission control information and whose transmission attribute is a $Q^{th}$ transmission attribute, wherein M is an integer, $1 \leq M \leq N$, Q is an integer, and $1 \leq Q \leq N$.

34. The non-transitory computer-readable storage medium according to claim 33, wherein at least one of the N pieces of transmission control information comprises a transmission resource indication, and the transmission resource indication indicates at least a transmission resource of transmission feedback information.

35. The non-transitory computer-readable storage medium according to claim 33, wherein the transmission attribute comprises a control resource set (CORESET).

36. The non-transitory computer-readable storage medium according to claim 33, wherein an arrangement sequence of the N feedback fields in the transmission feedback information is a sequence of transmission attributes of the N pieces of transmission control information.

37. A communications chip comprising at least one processor, wherein the at least one processor is coupled with at least one memory that stores computer instructions, that when executed by the at least one processor, cause the at least one processor to perform operations comprising:
generating N pieces of transmission control information, wherein each piece of transmission control information is for scheduling one transport block, a transmission attribute of each of the N pieces of transmission control information is one of a first transmission attribute to an $N^{th}$ transmission attribute in a same type of transmission attributes, and a transmission attribute of any piece of transmission control information is different from transmission attributes of other pieces of transmission control information, wherein N is an integer greater than 1;
sending the N pieces of transmission control information; and
receiving transmission feedback information corresponding to transport blocks respectively scheduled by using the N pieces of transmission control information, wherein the transmission feedback information comprises N feedback fields: a first feedback field to an $N^{th}$ feedback field, and an $M^{th}$ feedback field provides a feedback specific to a transport block scheduled by using transmission control information that is in the N pieces of transmission control information and whose transmission attribute is a $Q^{th}$ transmission attribute, wherein M is an integer, $1 \leq M \leq N$, Q is an integer, and $1 \leq Q \leq N$.

38. The communications chip according to claim 37, wherein at least one of the N pieces of transmission control information comprises a transmission resource indication, and the transmission resource indication indicates at least a transmission resource of transmission feedback information.

39. The communications chip according to claim 37, wherein the transmission attribute comprises a control resource set (CORESET).

40. The communications chip according to claim 37, wherein an arrangement sequence of the N feedback fields in the transmission feedback information is a sequence of transmission attributes of the N pieces of transmission control information.

* * * * *